US010754540B2

(12) United States Patent
Ye et al.

(10) Patent No.: US 10,754,540 B2
(45) Date of Patent: Aug. 25, 2020

(54) IMAGE SHARING METHOD AND ELECTRONIC DEVICE

(71) Applicant: Huawei Technologies Co., Ltd., Shenzhen (CN)

(72) Inventors: Fei Ye, Wuhan (CN); Qi Xie, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/607,568

(22) PCT Filed: Apr. 24, 2017

(86) PCT No.: PCT/CN2017/081665
§ 371 (c)(1),
(2) Date: Oct. 23, 2019

(87) PCT Pub. No.: WO2018/195708
PCT Pub. Date: Nov. 1, 2018

(65) Prior Publication Data
US 2020/0117331 A1   Apr. 16, 2020

(51) Int. Cl.
*H04B 7/00* (2006.01)
*G06F 3/0488* (2013.01)
(Continued)

(52) U.S. Cl.
CPC .......... *G06F 3/0488* (2013.01); *G06F 3/0482* (2013.01); *G06F 3/04817* (2013.01); *G06F 3/04845* (2013.01); *H04N 21/47* (2013.01)

(58) Field of Classification Search
CPC .. G06F 3/0488; G06F 3/04817; G06F 3/0482; G06F 3/04845; H04W 4/80
See application file for complete search history.

(56) References Cited

U.S. PATENT DOCUMENTS

| 8,019,280 B2 * | 9/2011 | Tsfaty | H04L 1/1867 455/41.2 |
| 2013/0022185 A9 * | 1/2013 | Khedouri | G11B 27/034 379/102.03 |

(Continued)

FOREIGN PATENT DOCUMENTS

| CN | 102638774 A | 8/2012 |
| CN | 103023964 A | 4/2013 |

(Continued)

OTHER PUBLICATIONS

Machine Translation and Abstract of Chinese Publication No. CN102638774, Aug. 15, 2012, 29 pages.
(Continued)

*Primary Examiner* — Tuan Pham
(74) *Attorney, Agent, or Firm* — Conley Rose, P.C.

(57) ABSTRACT

Embodiments of this application provide an image sharing method. The method includes: establishing, by a first electronic device, a Bluetooth link to a second electronic device; establishing, by the first electronic device, a Wi-Fi link to a Wi-Fi wireless access point, and establishing, by the second electronic device, a Wi-Fi link to the Wi-Fi wireless access point; obtaining, by the first electronic device, an image, and sending the image to the second electronic device over a Wi-Fi link; and after receiving the image, determining, by the second electronic device, whether a display screen of the second electronic device is on. The second electronic device displays the image on the display screen if determining that the display screen is on. According to the method in this application, transaction processing efficiency of an electronic device can be greatly increased.

20 Claims, 22 Drawing Sheets

(51) Int. Cl.
*G06F 3/0481* (2013.01)
*G06F 3/0482* (2013.01)
*G06F 3/0484* (2013.01)
*H04N 21/47* (2011.01)

(56) References Cited

U.S. PATENT DOCUMENTS

| | | |
|---|---|---|
| 2013/0161383 A1 | 6/2013 | Hashimoto |
| 2014/0192681 A1 | 7/2014 | Hong et al. |
| 2014/0196025 A1 | 7/2014 | Corinella |
| 2014/0283128 A1 | 9/2014 | Shepherd et al. |
| 2015/0133098 A1 | 5/2015 | Warr |
| 2015/0317117 A1 | 11/2015 | Yun |
| 2016/0094648 A1 | 3/2016 | Han et al. |
| 2016/0155426 A1 | 6/2016 | Gunn et al. |
| 2016/0283181 A1 | 9/2016 | Jung et al. |
| 2018/0150195 A1* | 5/2018 | Lugo ................ G06Q 50/01 |

FOREIGN PATENT DOCUMENTS

| | | | |
|---|---|---|---|
| CN | 103577089 A | 2/2014 | |
| CN | 103874168 A | 6/2014 | |
| CN | 104156217 A | 11/2014 | |
| CN | 104981763 A | 10/2015 | |
| CN | 105122780 A | 12/2015 | |
| CN | 105723755 A | 6/2016 | |
| CN | 105739699 A | 7/2016 | |
| CN | 106095401 A | 11/2016 | |
| CN | 106231130 A | 12/2016 | |
| CN | 106254213 A | 12/2016 | |
| EP | 2755198 A1 | 7/2014 | |
| JP | 2003125321 A | 4/2003 | |
| JP | 2003125321 A * | 4/2003 | ............ H04N 5/76 |
| JP | 2011035768 A * | 2/2011 | ............ H04N 7/173 |
| JP | 2011035768 A | 2/2011 | |
| JP | 2015162040 A | 9/2015 | |
| JP | 2016174348 A | 9/2016 | |
| JP | 2016174348 A * | 9/2016 | ......... H04N 1/00103 |
| KR | 20140009851 A * | 1/2014 | |
| KR | 20140062069 A * | 5/2014 | ........... G06F 16/583 |
| KR | 101658614 B1 * | 9/2016 | ............ B64C 39/02 |
| KR | 101658614 B1 | 9/2016 | |
| KR | 20160121982 A * | 10/2016 | ............ H04L 29/06 |

OTHER PUBLICATIONS

Machine Translation and Abstract of Chinese Publication No. CN105739699, Jul. 6, 2016, 26 pages.
Machine Translation and Abstract of Chinese Publication No. CN106095401, Nov. 9, 2016, 18 pages.
Machine Translation and Abstract of Chinese Publication No. CN106231130, Dec. 14, 2016, 30 pages.
Machine Translation and Abstract of Chinese Publication No. CN106254213, Dec. 21, 2016, 20 pages.
Machine Translation and Abstract of Japanese Publication No. JP2015162040, Sep. 7, 2015, 26 pages.
Apple Inc., "The power of Mac. Taken further," macOS catalina, Retrieved from the Internet: https://www.apple.com./macos/catalina/ on Jan. 9, 2020, 18 pages.
Foreign Communication From a Counterpart Application, PCT Application No. PCT/CN2017/081665, English Translation of International Search Report dated Dec. 27, 2017, 4 pages.
Foreign Communication From a Counterpart Application, PCT Application No. PCT/CN2017/081665, English Translation of Written Opinion dated Dec. 27, 2017, 6 pages.
Suodenjoki, M., "Photo Caption—Direct from EXIF Image Data," XP055673781, Dec. 29, 2008, 3 pages.
Wallen, J., et al., "Disable notification content on Lollipop lock screen for better privacy," XP055674240, Apr. 8, 2015, 12 pages.

* cited by examiner

IMAGE SHARING METHOD AND ELECTRONIC DEVICE

CROSS-REFERENCE TO RELATED APPLICATIONS

This application is a U.S. National Stage of International Patent Application No. PCT/CN2017/081665 filed on Apr. 24, 2017, which is hereby incorporated by reference in its entirety.

TECHNICAL FIELD

Embodiments of the present invention relate to the field of data processing, and in particular, to an image sharing method and an electronic device.

BACKGROUND

With rapid development of mobile Internet, a growing quantity of electronic devices (such as mobile phones and tablet computers) can share tiles (such as pictures and videos) with each other. For example, a user may select some pictures on a mobile phone A, enable Wi-Fi or Bluetooth, find an object to be sent, and send these pictures to a specified mobile phone B by means of Wi-Fi or Bluetooth. A user of the mobile phone B needs to confirm reception of the pictures shared by the user of the mobile phone A. If the mobile phone B confirms reception, the mobile phone B saves the pictures. It can be learned that in the prior art, a method for sharing a file between two electronic devices is very complex, so a user needs to perform many operations in the method, resulting in low efficiency of sharing a file between the electronic devices, and reducing a capability of intelligent interaction between an electronic device and the user.

SUMMARY

To resolve the foregoing technical problem, embodiments of this application provide an image sharing method and an electronic device, so that when the electronic device shares an image, a quantity of operation steps of a user can be reduced, transaction processing efficiency of the electronic device can be increased, and a capability of intelligent interaction between the electronic device and the user can be improved.

According to a first aspect, an embodiment of this application provides an image sharing method, and the method is implemented on an electronic device having a touchscreen. The method may include: establishing, by a first electronic device, a Bluetooth link to a second electronic device by means of Bluetooth; establishing, by the first electronic device, a Wi-Fi link to a Wi-Fi wireless access point, establishing, by the second electronic device, a Wi-Fi link to the Wi-Fi wireless access point, and connecting, by the first electronic device, to the second electronic device by means of Wi-Fi Direct, to form a Wi-Fi Direct link; obtaining, by the first electronic device, image information, where the image information includes an obtained image and device information of the first electronic device, and the image is a screenshot or an image that is captured by using a camera of the first electronic device; sending, by the first electronic device, the obtained image information to the second electronic device over the Wi-Fi Direct link; after receiving the image information, determining, by the second electronic device, whether a display screen of the second electronic device is on; and displaying, by the second electronic device, the image and the device information on the display screen if determining that the display screen is on; or skipping displaying, by the second electronic device, the image or the device information on the display if determining that the display screen is not on; and after the displaying the image and the device information on the display screen of the second electronic device, the method may further include: determining, by the second electronic device, whether to receive, within a preset time, a touch operation of a user on the display screen; and if the touch operation of the user on the display screen is received within the preset time, displaying a graphical user interface on the second electronic device in response to the touch operation, where the graphical user interface includes the image and a control that is used for editing the image; or if the touch operation of the user on the display screen is not received within the preset time, stopping displaying the image and the device information on the display screen. According to the foregoing technical solution, when the electronic device shares an image, a quantity of operation steps of a user can be reduced, transaction processing efficiency of the electronic device can be increased, and a capability of intelligent interaction between the electronic device and the user can be improved.

In a possible implementation, the displaying the image and the device information on the display screen may specifically include: displaying the image in a file on the display screen of the second electronic device, and automatically adding an image description below the image, where the file is a Word document that is being edited, the Word document has a plurality of characters, the image is inserted among the plurality of characters, and after the image is inserted, the Word document automatically adjusts typesetting and is displayed on the display screen. According to this technical solution with automatic editing, document editing is simpler, thereby increasing use efficiency of the electronic device.

In a possible implementation, the sending, by the first electronic device, the image information to the second electronic device over the Wi-Fi Direct link may specifically include: sending, by the first electronic device based on a distance between the second electronic device and the first electronic device, image information corresponding to the distance to the second electronic device over the Wi-Fi Direct link.

According to a second aspect, an embodiment of this application provides an image sharing method. The method may include the following steps: establishing, by a first electronic device, a Bluetooth link to a second electronic device by means of Bluetooth; establishing, by the first electronic device, a Wi-Fi link to a Wi-Fi wireless access point, establishing, by the second electronic device, a Wi-Fi link to the Wi-Fi wireless access point, and connecting, by the first electronic device, to the second electronic device by means of Wi-Fi Direct, to form a Wi-Fi Direct link; obtaining, by the first electronic device, image information, where the image information includes an obtained image; sending, by the first electronic device, the image information to the second electronic device over the Wi-Fi Direct link; after receiving the image information, determining, by the second electronic device, whether a display screen of the second electronic device is on; and displaying, by the second electronic device, the image on the display screen if determining that the display screen is on. According to the foregoing technical solution, when the electronic device shares an image, a quantity of operation steps of a user can be reduced, transaction processing efficiency of the electronic device can be increased, and a capability of intelligent interaction between the electronic device and the user can be improved.

In a possible implementation, after the displaying the image on the display screen of the second electronic device, the method may further include: determining, by the second electronic device, whether to receive, within a preset time, a touch operation of a user on the display screen; and if the touch operation of the user on the display screen is received within the preset time, displaying a graphical user interface on the second electronic device in response to the touch operation, where the graphical user interface includes the image and a control that is used for editing the image. According to the foregoing implementation, when the user is interested in the image, the electronic device can display more controls for the image, so that the user performs further processing, thereby improving a capability of intelligent interaction between the electronic device and the user, and improving user experience.

In a possible implementation, if the touch operation of the user on the display screen is not received within the preset time, the image stops being displayed on the display screen. If the touch operation of the user is not received, it indicates that the user is not interested in the image. Therefore, it is unnecessary for the electronic device to display the image. In this way, the capability of intelligent interaction of the electronic device is further improved.

In a possible implementation, the touch operation is a touch operation of the user at any location on the display screen, In this way, the user does not need to specially touch a location on the display screen, and can perform an operation in a relatively convenient manner, so that the electronic device senses that the user is interested in the image.

In a possible implementation, the image information further includes a device version or a device name of the first electronic device. When the image is displayed on the second electronic device, the device version of the first electronic device is further displayed. In this way, the user can visually know who sends the image, thereby further improving the capability of intelligent interaction of the electronic device, and improving user experience.

In a possible implementation, a start point of the preset time is a time point at which the image is displayed on the display screen.

According to a third aspect, an embodiment of this application provides an electronic device. The electronic device may include a processor, a touchscreen, a Wi-Fi apparatus, a Bluetooth apparatus, a power supply apparatus, and a memory. The electronic device establishes a Bluetooth link to another electronic device by using the Bluetooth apparatus. The Wi-Fi apparatus establishes a Wi-Fi link to a Wi-Fi wireless access point. The electronic device connects to the another electronic device by means of Wi-Fi Direct, to form a Wi-Fi Direct link. The processor obtains image information from the memory, where the image information includes an obtained image and/or device information of the electronic device. The processor sends the image information to the another electronic device over the Wi-Fi Direct link. After receiving the image information, the another electronic device determines whether a display screen of the another electronic device is on. The second electronic device displays the image and the device information on the display screen if determining that the display screen is on. The second electronic device skips displaying the image or the device information on the display if determining that the display screen is not on. According to the foregoing technical solution, when the electronic device shares an image, a quantity of operation steps of a user can be reduced, transaction processing efficiency of the electronic device can be increased, and a capability of intelligent interaction between the electronic device and the user can be improved.

According to a fourth aspect, an embodiment of this application provides a computer device. The computer device may include a memory, a processor, and a computer program that is stored in the memory and that can be run in the processor, where the processor performs the computer program to implement the following steps: establishing, by a first electronic device, a Bluetooth link to a second electronic device by means of Bluetooth; establishing, by the first electronic device, a Wi-Fi link to a Wi-Fi wireless access point, establishing, by the second electronic device, a Wi-Fi link to the Wi-Fi wireless access point, and connecting, by the first electronic device, to the second electronic device by means of Direct, to form a Wi-Fi Direct link; obtaining, by the first electronic device, image information, where the image information includes an obtained image; sending, by the first electronic device, the image information to the second electronic device over the Wi-Fi Direct link; after receiving the image information, determining, by the second electronic device, whether a display screen of the second electronic device is on; and displaying, by the second electronic device, the image on the display screen if determining that the display screen is on.

In a possible implementation, after the displaying the image on the display screen of the second electronic device, the method may further include: determining, by the second electronic device, whether to receive, within a preset time, a touch operation of a user on the display screen; and if the touch operation of the user on the display screen is received within the preset time, displaying a graphical user interface on the second electronic device in response to the touch operation, where the graphical user interface includes the image and a control that is used for editing the image. According to the foregoing implementation, when the user is interested in the image, an electronic device can display more controls for the image, so that the user performs further processing, thereby improving a capability of intelligent interaction between the electronic device and the user, and improving user experience.

According to another aspect of this application, a computer-readable storage medium is provided. The computer-readable storage medium stores an instruction, and when being run on a computer, the instruction enables the computer to perform the method according to the foregoing aspects.

According to another aspect of this application, a computer program product including an instruction is provided, and when being run on a computer, the instruction enables the computer to perform the method according to the foregoing aspects.

It should be understood that, in the specification, descriptions about technical features, technical solutions, advantages, or similar words do not imply that all characteristics and advantages can be implemented in any single embodiment. On the contrary, it can be understood that the descriptions about features or advantages mean that at least one embodiment includes particular technical features, technical solutions, or advantages. Therefore, in the specification, the descriptions about technical features, technical solutions, or advantages are not necessarily included in a same embodiment. In addition, technical features, technical solutions, and advantages described in the following embodiments may be further combined in any appropriate manner. Persons skilled in the art understand that, an embodiment can be implemented without one or more particular technical features, technical solutions, or advantages in a particular embodiment. In another embodiment, an additional technical feature and advantage can be identified in a particular embodiment that does not reflect all embodiments.

DESCRIPTION OF EMBODIMENTS

Electronic devices in the following embodiments may be various devices having a wireless communication function, for example, may be wearable electronic devices (such as smartwatches) having a wireless communication function, or may be a mobile phone, a portable computer (laptop), a tablet computer, and the like. Specific forms of the electronic devices are not specially limited in the following embodiments.

Figure 1:
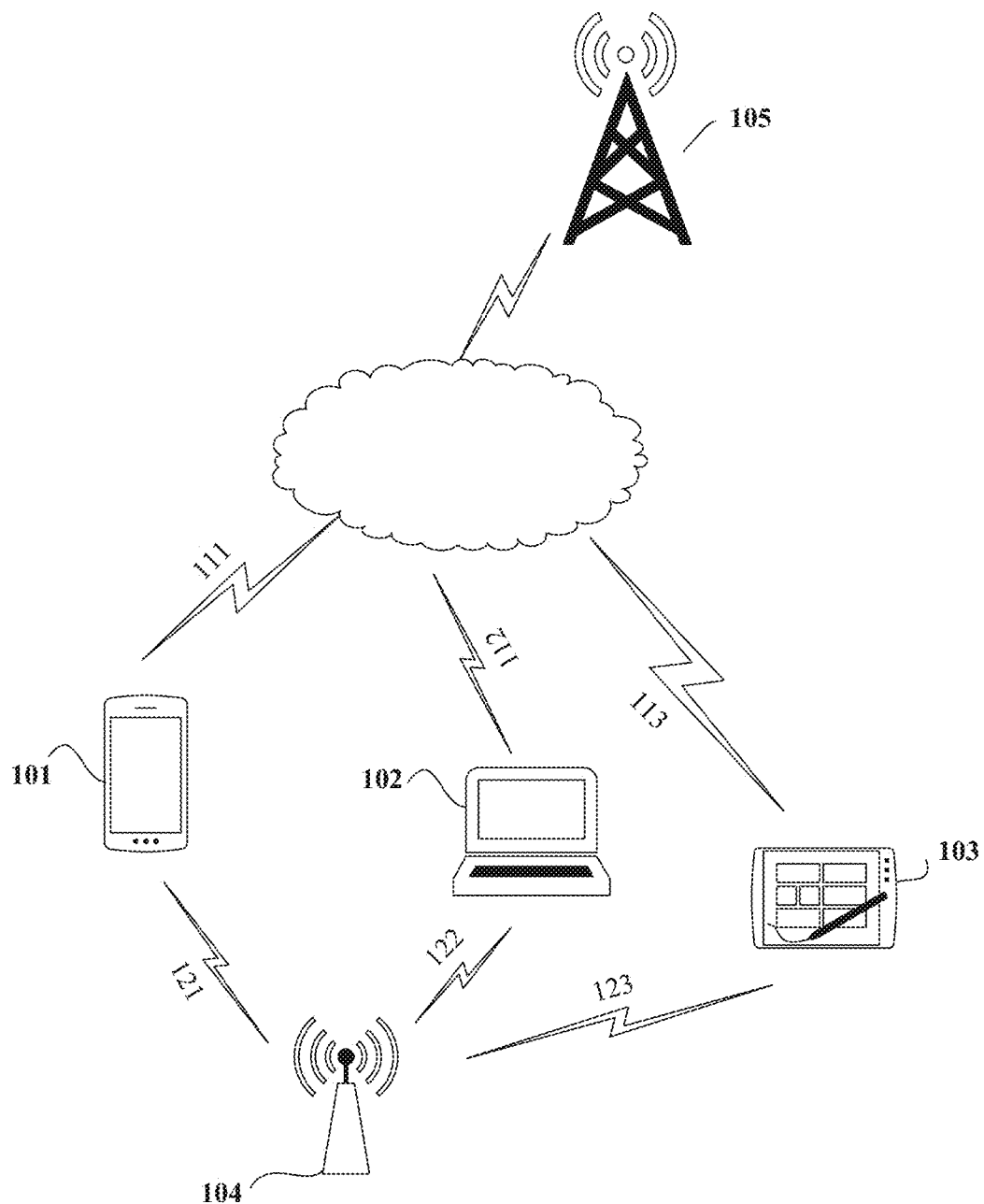
FIG. 1 is a schematic diagram of an environment for various electronic devices in a communications network according to some embodiments.

FIG. 1 is a schematic diagram of an environment for electronic devices in a communications network. For example, a mobile phone 101 may perform wireless communication with a base station 305 on a network side by using a wireless link 311, a portable computer 102 may perform wireless communication with the base station 305 by using a wireless link 312, and a tablet computer 103 may perform wireless communication with the base station 305 by using a wireless link 313. It can be understood that, the mobile phone 101, the portable computer 102, and the tablet computer 103 may perform wireless communication with different base stations, because the three types of electronic devices may be not in a same cell (namely, a signal coverage area of a same base station). In some other embodiments of this application, the mobile phone 101 may perform short-range wireless communication with a wireless access point 104 by using a wireless link 121, the portable computer 102 may perform short-range wireless communication with the wireless access point 104 by using a wireless link 122, and the tablet computer 103 may perform short-range wireless communication with the wireless access point 104 by using a wireless link 123. The short-range wireless communication may be wireless communication that complies with a standard protocol related to Wi-Fi. Correspondingly, the wireless access point 104 may be a Wi-Fi hotspot. The short-range wireless communication may alternatively be wireless communication that complies with a standard protocol related to Bluetooth. Correspondingly, the wireless access point 104 may be a Bluetooth beacon (beacon). In some other embodiments of this application, the mobile phone 101, the portable computer 102, and the tablet computer 103 may alternatively communicate with each other in another wireless communication manner.

Figure 2:
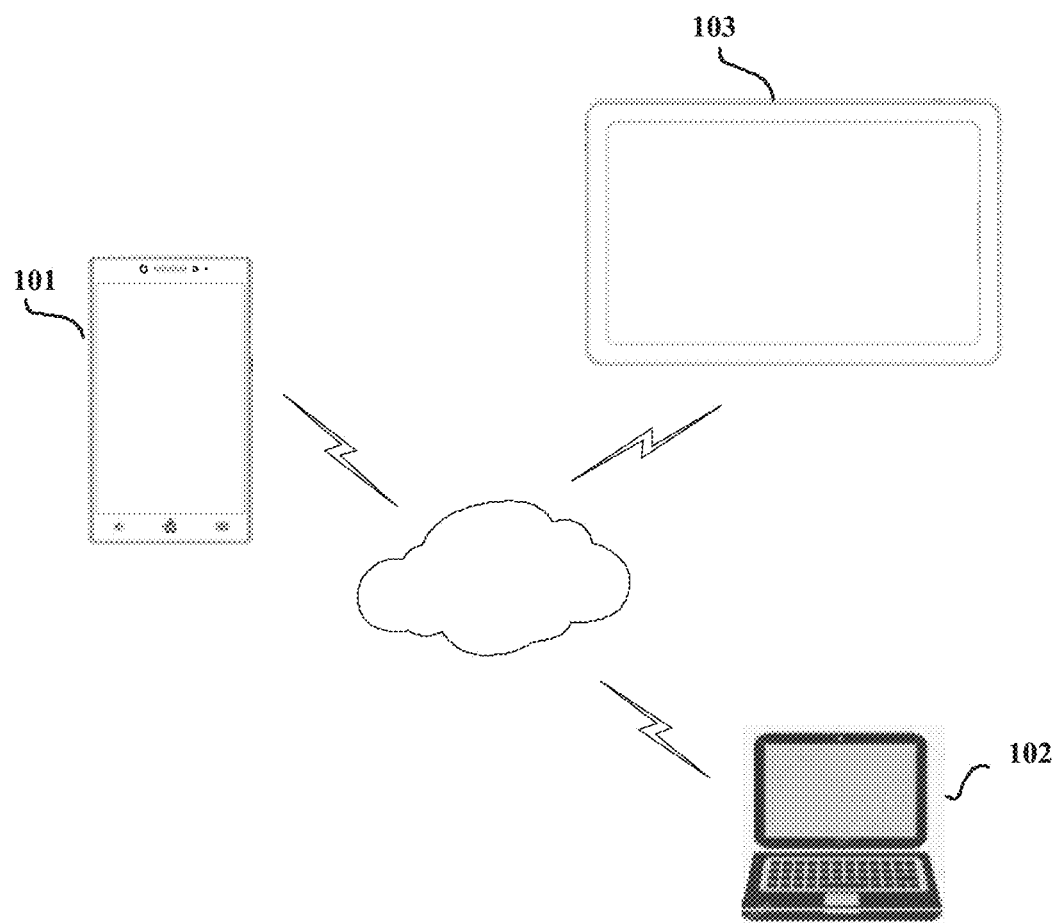
FIG. 2 is a schematic diagram of a use scenario for a mobile phone, a tablet computer, and a portable computer according to some embodiments.

In some embodiments of this application, as shown in FIG. 2, the mobile phone 101, the portable computer 102, and the tablet computer 103 may establish Wi-Fi links to each other by means of Wi-Fi Direct, to form a wireless local area network. The three electronic devices may transmit (namely, send) a file (such as a picture, a video, or a document) to each other by using the wireless local area network. In some other embodiments of this application, the three electronic devices may alternatively establish Bluetooth links to each other by means of Bluetooth beacons, to form a wireless local area network. The three electronic devices may alternatively transmit a file by using the wireless local area network.

Figure 3:
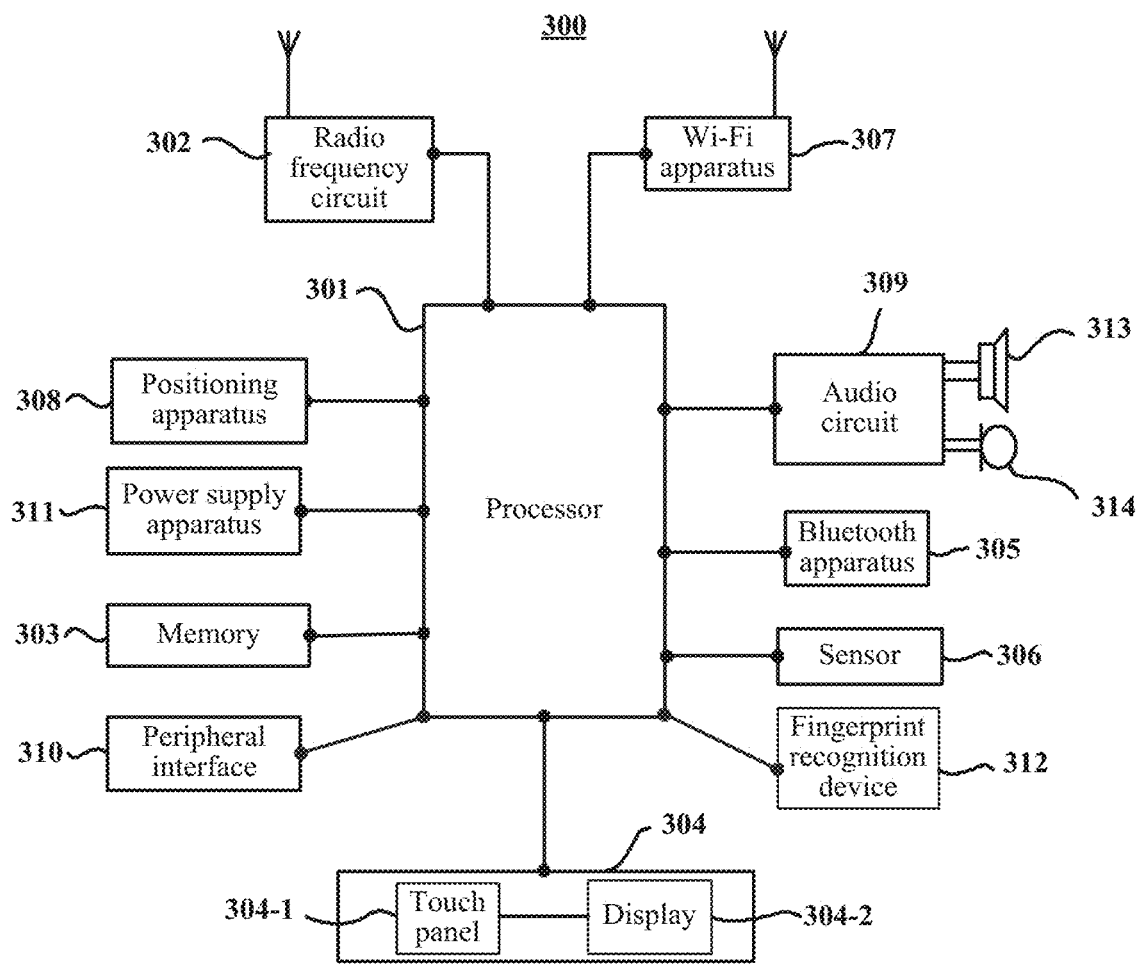
FIG. 3 is a schematic structural diagram of hardware of an electronic device according to some embodiments.

FIG. 3 is a schematic structural diagram of hardware of an electronic device 300 for implementing the following embodiments, The following provides a specific description by using the electronic device 300 shown in FIG. 3 as an example. It should be understood that, the electronic device 300 shown in the figure is only an example of an electronic device, and the electronic device 300 may have more or fewer components than those shown in the figure, may have a combination of two or more components, or may have different component configurations. The components shown in the figure may be implemented in hardware, software, or a combination of hardware and software that includes one or more signal processing and/or application-specific integrated circuits.

As shown in FIG. 3, the electronic device 300 may specifically include components such as a processor 301, a radio frequency (RF) circuit 302, a memory 303, a touchscreen 304, a Bluetooth apparatus 305, one or more sensors 306, a Wi-Fi apparatus 307, a positioning apparatus 308, an audio circuit 309, a peripheral interface 310, and a power supply apparatus 311. These components may communicate with each other by using one or more communication buses or signal lines (not shown in FIG. 3). Persons skilled in the art may understand that, a hardware structure shown in FIG. 3 does not constitute a limitation on the electronic device, and the electronic device 300 may include more or fewer components than those shown in the figure, or some components may be combined, or a different component deployment may be used.

The following specifically describes the components of the electronic device 300 with reference to FIG. 3.

The processor 301 is a control center of the electronic device 300, and is connected to various parts of the electronic device 300 by using various interfaces and lines. By running or executing the application program stored in the memory 303, and invoking data stored in the memory 303, the processor 301 performs various functions and data processing of the electronic device 300. In some embodiments, the processor 301 may include one or more processing units. The processor 301 may be further integrated with an application processor and a modem processor. The application processor mainly processes an operating system, a user interface, an application program, and the like. The modem processor mainly processes wireless communication. It may be understood that the modem processor may alternatively not be integrated into the processor 301. For example, the processor 301 may be a Kirin 960 chip manufactured by Huawei Technologies Co., Ltd.

The radio frequency circuit 302 may be configured to receive and send a radio signal during information receiving and sending or a call. In particular, the radio frequency circuit 302 may receive downlink data of a base station and then delivers the downlink data to the processor 301 for processing. In addition, the radio frequency circuit 302 sends uplink-related data to the base station. Usually, the radio frequency circuit includes, but is not limited to, an antenna, at least one amplifier, a transceiver, a coupler, a low noise amplifier, a duplexer, and the like. In addition, the radio frequency circuit 302 may further communicate with another device by means of wireless communication. The wireless communication may use any communications standard or protocol, which includes, but is not limited to, Global System for Mobile Communications, General Packet Radio Service, Code Division Multiple Access, Wideband Code Division Multiple Access, Long Term Evolution, email, Short Messaging Service, and the like.

The memory 303 is configured to store an application program and data. The processor 301 runs the application program and the data that are stored in the memory 303, to implement various functions and data processing of the electronic device 300. The memory 303 mainly includes a program storage area and a data storage area. The program storage area may store an operating system, an application program required by at least one function (such as a sound playing function or an image playing function). The data storage area may store data (such as audio data and an address book) created based on use of the electronic device 300. In addition, the memory 303 may include a high-speed random access memory, and may further include a non-volatile memory such as a magnetic disk storage device or a flash memory, another volatile solid storage device, or the like. The memory 303 may store various operating systems, for example, an iOS® operating system developed by Apple Inc. and an Android® operating system developed by Google Inc.

The touchscreen 304 may include a touch panel 304-1 and a display 304-2. The touch panel 304-1 may collect a touch event of a user of the electronic device 300 on or near the electronic device 300 (for example, an operation of the user on the touch panel 304-1 or near the touch panel 304-1 by using any suitable object such as a finger or a stylus), and send collected touch information to another device such as the processor 301. The operation of the user near the touch panel 304-1 may be referred to as a floating touch, and the touch panel 304-1 that can perform the floating touch may be implemented into a touch panel of a type such as capacitive, infrared light sensation, or ultrasonic. The touch panel 304-1 may include two components, namely, a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 301. The touch controller can further receive and execute an instruction sent by the processor 301. In addition, the touch panel 304-1 may be implemented into touch panels of a plurality of types such as resistive, capacitive, infrared, and surface acoustic wave. The display (also referred to as a display screen) 304-2 may be configured to display information that is input by the user or information provided to the user, and various menus of the electronic device 300. The display 304-2 may be configured by using a liquid crystal display, an organic light-emitting diode, or the like. The touch panel 304-1 may cover the display 304-2. After detecting a touch event on or near the touch panel 304-1, the touch panel 304-1 transfers the touch event to the processor 301, to determine a type of the touch event. Then, the processor 301 may provide a corresponding visual output on the display 304-2. based on the type of the touch event. In FIG. 3, the touch panel 304-1 and the display screen 304-2 are used as two independent components to implement input and output functions of the electronic device 300. However, in some embodiments, the touch panel 304-1 and the display screen 304-2 may be integrated to implement the input and output functions of the electronic device 300. It can be understood that, the touchscreen 304 is formed by stacking a plurality of materials. In the embodiments of this application, only a touch panel (layer) and a display screen (layer) are presented, and another layer is not described in detail in the embodiments of this application.

The Bluetooth apparatus 305 is configured to implement data exchange between the electronic device 300 and another short-range electronic device (such as a mobile phone or a smartwatch). The Bluetooth apparatus in the embodiments of this application may be an integrated circuit or a Bluetooth chip.

The electronic device 300 may further include at least one sensor 306, such as an optical sensor, a motion sensor, or another sensor. Specifically, the optical sensor may include an ambient light sensor and a proximity sensor. The ambient light sensor can adjust brightness of a display of the touchscreen 304 based on brightness of ambient light, and the proximity sensor can turn off a power supply of the display when the electronic device 300 is moved to an ear. As one type of motion sensor, an acceleration sensor can detect magnitude of accelerations in various directions (generally on three axes), can detect magnitude and a direction of the gravity when static, and may be applied to an application that recognizes an attitude of a mobile phone (for example, switching between landscape orientation and portrait orientation, a related game, and magnetometer posture calibration), and a function related to vibration recognition (such as a pedometer and a knock), and the like. Another sensor such as a gyroscope, a barometer, a hygrometer, a thermometer, and an infrared sensor may be further configured in the electronic device 300. Details are not described herein.

The Wi-Fi apparatus 307 is configured to provide network access complying with a standard protocol related to Wi-Fi to the electronic device 300. The electronic device 300 may access a Wi-Fi wireless access point by using the Wi-Fi apparatus 307, and help the user receive and send an email, browse a web page, access streaming media, and so on. The electronic device 300 provides wireless wideband Internet access to the user. In some other embodiments, the Wi-Fi apparatus 307 may alternatively serve as the wireless access point, and may provide Wi-Fi network access to another electronic device.

The positioning apparatus 308 is configured to provide a geographical location to the electronic device 300. It can be understood that, the positioning apparatus 308 may specifically be a receiver of a positioning system such as the Global Positioning System (GPS), the BeiDou Navigation Satellite System, or the Russian GLONASS. After receiving a geographical location sent by the positioning system, the positioning apparatus 308 sends the information to the processor 301 for processing, or sends the information to the memory 303 for storage. In some other embodiments, the positioning apparatus 308 may be a receiver of the Assisted Global Positioning System (AGPS). The AGPS is an operation mode of performing GPS positioning with assistance and cooperation. The AGPS may use a base station signal in cooperation with a GPS satellite signal to allow quicker positioning of the electronic device 300. In the AGPS system, the positioning apparatus 308 may obtain positioning assistance by communicating with an assisted positioning cloud server (such as a mobile phone positioning cloud server). The AGPS system serves as the assisted positioning cloud server to help the positioning apparatus 308 complete a ranging service and a positioning service. In this case, the assisted positioning cloud server provides positioning assistance by communicating with the positioning apparatus 308 (namely, a GPS receiver) of the electronic device such as the electronic device 300 by using a wireless communications network. In some other embodiments, the positioning apparatus 308 may alternatively be a positioning technology based on a Wi-Fi wireless access point. Each Wi-Fi wireless access point has a globally unique MAC address, and the electronic device can scan and collect a broadcast signal of a nearby Wi-Fi wireless access point when Wi-Fi is enabled. Therefore, an MAC address broadcast by the Wi-Fi wireless access point may be obtained. The electronic device sends these data (for example, the MAC address) that can mark the Wi-Fi wireless access point to a position cloud server by using the wireless communications network, and the cloud server retrieves a geographical location of each Wi-Fi wireless access point, calculates a geographical location of the electronic device by combining strength of a Wi-Fi broadcast signal, and sends the geographical location to the positioning apparatus 308 of the electronic device.

The audio circuit 309, a speaker 313, and a microphone 314 may provide an audio interface between the user and the electronic device 300. The audio circuit 309 may convert received audio data into an electrical signal and transmit the electrical signal to the speaker 313. The speaker 313 converts the electrical signal into a sound signal for output. In addition, the microphone 314 converts a collected sound signal into an electrical signal. The audio circuit 309 receives the electrical signal, converts the electrical signal into audio data, and outputs the audio data to the RF circuit 302 to send the audio data to, for example, another mobile phone, or outputs the audio data to the memory 303 for further processing.

The peripheral interface 310 is configured to provide various interfaces to external input/output devices (such as a keyboard, a mouse, an external display, an external memory, and a subscriber identity module). For example, a mouse is connected by using a Universal Serial Bus (USB) interface, and a subscriber identity module (SIM) card provided by a telecommunications operator is connected by using a metal contact on a subscriber identity module slot. The peripheral interface 310 may be configured to couple the external input/output peripheral devices to the processor 301 and the memory 303.

The electronic device 300 may further include the power supply apparatus 311 (such as a battery or a power management chip) for supplying power to the components. The battery may be logically connected to the processor 301 by using the power management chip, thereby implementing functions such as charging and discharging management and power consumption management by using the power supply apparatus 311.

Although not shown in FIG. 3, the electronic device 300 may further include cameras (a front-facing camera and a rear-facing camera), a flash, a micro-projector, a near field communication (NFC) apparatus, and the like. Details are not described herein.

All methods in the following embodiments may be implemented on the electronic device 300 having the foregoing hardware structure.

Figure 4:
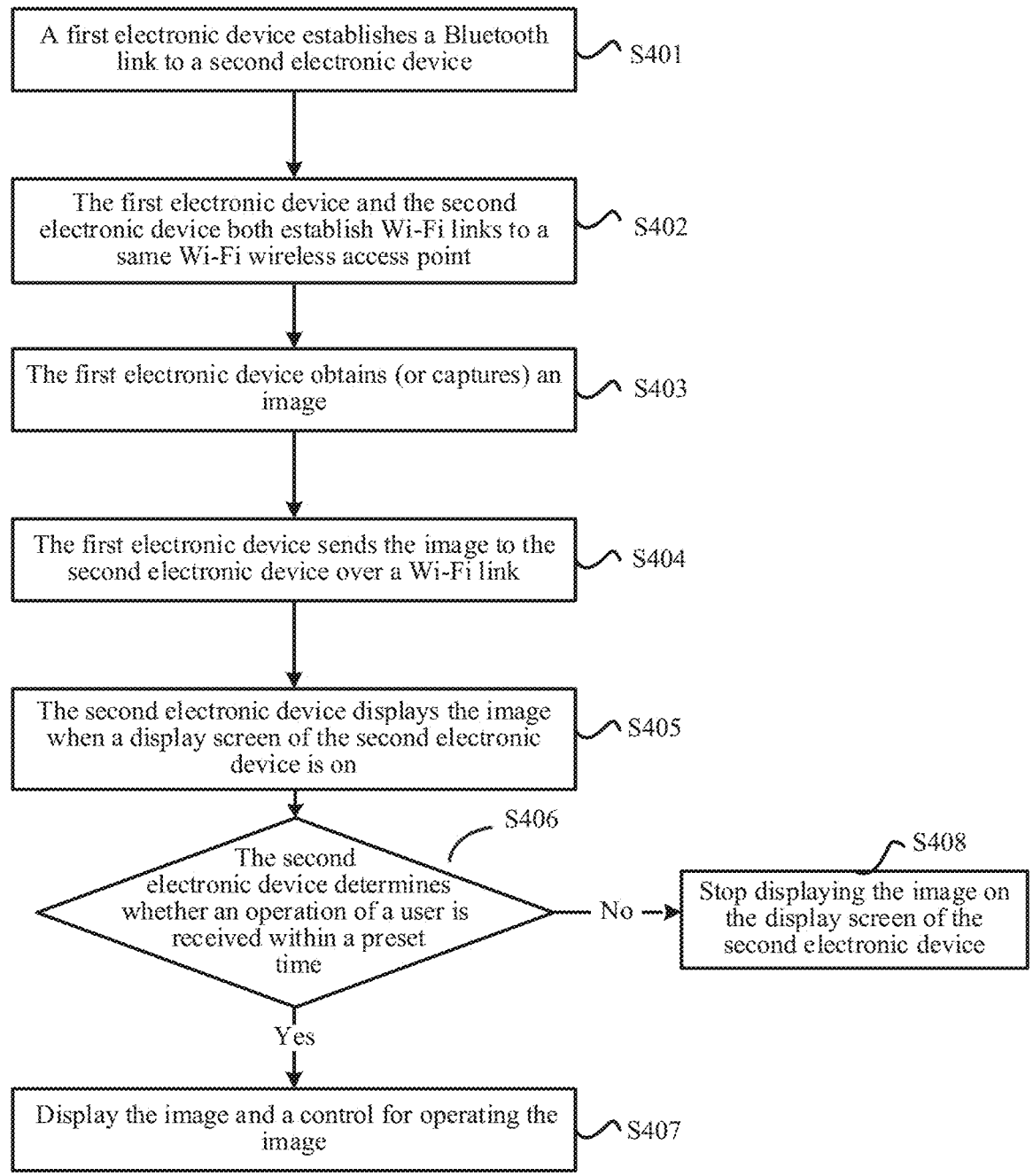
FIG. 4 is a schematic flowchart of a method according to some embodiments.

As shown in FIG. 4, an embodiment of this application provides an image sharing method. The method may be implemented on a first electronic device and a second electronic device. The two electronic devices may be the electronic devices 300 having the foregoing hardware structure. The method may specifically include the following steps.

Step S401: The first electronic device establishes a Bluetooth link to the second electronic device by means of Bluetooth.

Step S402: The first electronic device establishes a Wi-Fi link to a Wi-Fi wireless access point, and the second electronic device establishes a Wi-Fi link to the Wi-Fi wireless access point.

Step S403: The first electronic device obtains (or captures) an image. The first electronic device may capture the image by using a camera, or may obtain a screenshot by performing a particular operation, and the obtained screenshot is also the obtained image.

Step S404: After capturing the image, the first electronic device sends the image to the second electronic device over a link. In some embodiments of this application, the first electronic device may transmit the image to the second electronic device by means of Wi-Fi Direct.

Step S405: After receiving the image, the second electronic device determines to display the image when a display screen of the second electronic device is on. If the display screen of the second electronic device is not on, the second electronic device does not display the image. That the display screen is on may specifically mean that the display screen is powered on and a user can see content displayed on the display screen. In another embodiment of this application, the display screen that is on may alternatively be a lock screen interface displayed on the display screen. Therefore, the image may alternatively be displayed on the lock screen interface.

In the embodiment, according to a technical solution in which the first electronic device immediately transmits the obtained image to the second electronic device, and displays the image when the display screen of the second electronic device is on, the user can more efficiently and more quickly transmit the image without consuming data traffic of a mobile communications network, and user experience is improved.

In some other embodiments of this application, before step S401, the method may further include the following step:

Step S400: The first electronic device and the second electronic device are logged in to a same device account. In this embodiment of this application, a function of the device account means that some functions of an electronic device can be used only after the electronic device is logged in to a particular account. For example, functions such as fingerprint recognition and contacts synchronization can be used only after an electronic device is logged in to an account, and the functions cannot be used when the electronic device is not logged in to an account. When the user enters a device account ID and a password on the electronic device for login, authentication information (the device account ID and the password) can be sent to a cloud server by using a mobile network for authentication. The electronic device is logged in to a device account and a related function can be used only when the authentication succeeds. It can be understood that, the cloud server mainly performs authentication on the device account of the electronic device, and therefore the cloud server can know which electronic devices are logged in to a same device account, and can perform wireless communication with the electronic devices.

In some other embodiments of this application, the method may further include the following steps.

Step S406: The second electronic device determines whether an operation of a user is received within a preset time (such as five seconds), and if the operation of the user is received within the preset time, the second electronic device performs step S407; or if the operation of the user is not received within the preset time, the second electronic device performs step S408. The operation may be any operation performed by the user on the electronic device. For example, a finger of the user touches the display screen, and the user presses a volume key on a side of the second electronic device.

Figure 10A:
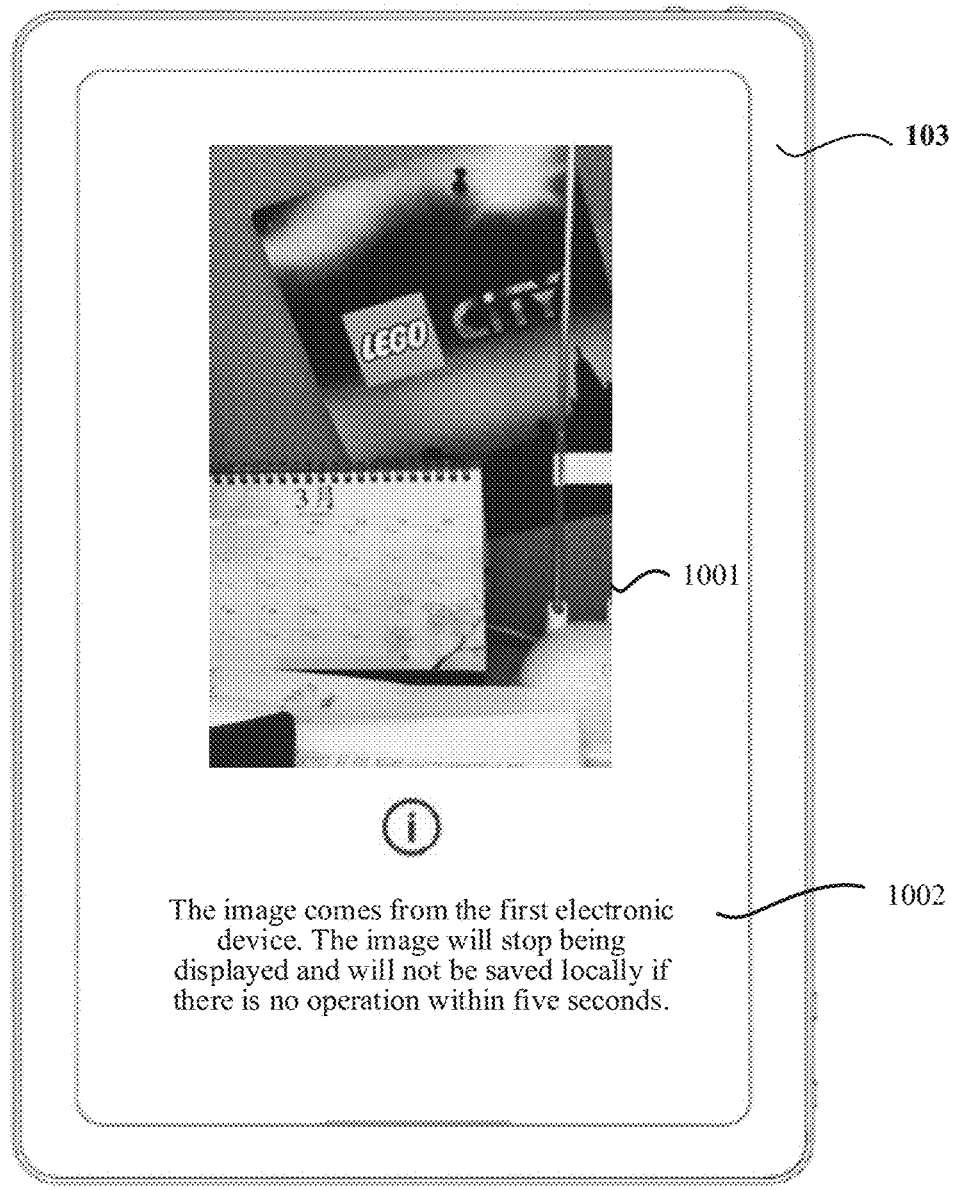
FIG. 10A to FIG. 10C are some graphical user interfaces displayed on a second electronic device according to some embodiments.
Figure 10B:
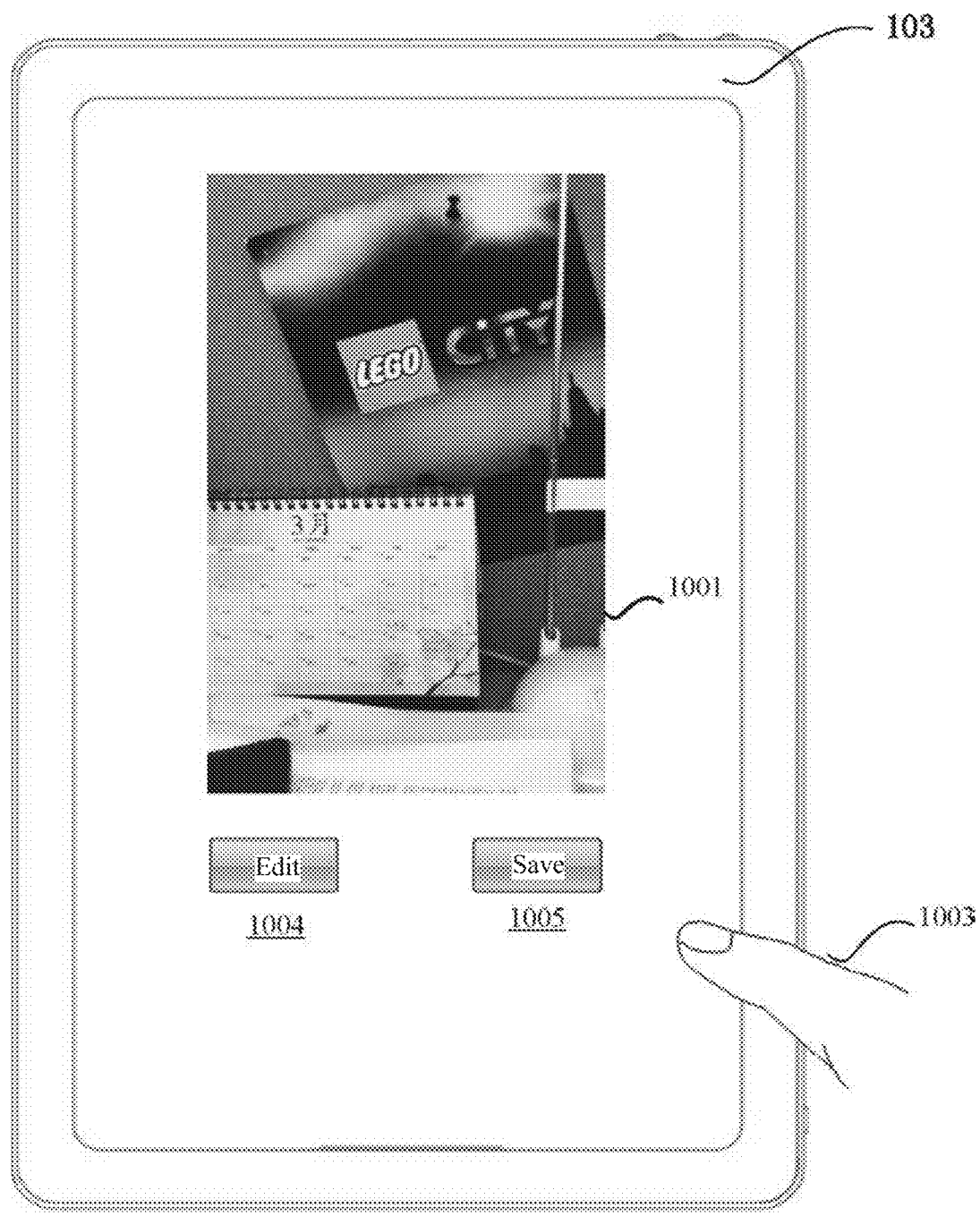

Step S407: When the image is displayed, display a control such as a virtual button, a link or an icon for operating the image. As shown in FIG. 10B, after a touch operation performed by a finger 1003 of the user on the display screen is received within the preset time, two virtual buttons 1004 and 1005 are further displayed when the image 1001 is displayed, so that the user performs an operation on the image. If the operation of the user is received within the preset time, it indicates that the user is interested in the image. Therefore, more controls are displayed on the display screen. In this way, the user can conveniently perform various operations on the image subsequently, and a capability of intelligent interaction between the second electronic device and the user is improved.

Step S408: Stop displaying the image on the display screen of the second electronic device. When the second electronic device determines that no operation of the user is received within the preset time, it indicates that the user sees the image but is not willing to save the image or is not willing to perform another operation on the image. In this case, the second electronic device does no need to display the image and does not need to save the image in a memory. In this way, an intellectual level of the second electronic device is improved.

In the embodiment, there is no definite order between step S400, step S401, and step S402. For example, in another embodiment, step S402 may be performed before step S401 or step S400 may be performed after step S402 provided that the following steps are all completed before step S403: the two electronic devices establish Wi-Fi links to a same Wi-Fi wireless access point, a Bluetooth link is established between the two electronic devices, and the two electronic devices are logged in to a same device account.

In some other embodiments of this application, step S404 may specifically be as follows:

After capturing the image, the first electronic device may first determine whether a display screen of the second electronic device is on. If determining that the display screen of the second electronic device is on, the first electronic device transmits the captured image to the second electronic device over a wireless link; or if determining that the display screen of the second electronic device is off, the first electronic device may not transmit the image to the second electronic device.

A specific method for the first electronic device to determine whether the display screen of the second electronic device is on may be that, the second electronic device actively feeds back current device status information such as whether the screen is off, a memory capacity, and device hardware/software version information to the first electronic device over a wireless link (such as a Bluetooth link or a Wi-Fi link). The first electronic device then determines, based on the device status information ted back by the second electronic device, whether the display screen of the second electronic device is on. In some other embodiments of this application, the method for the first electronic device to determine whether the display screen of the second electronic device is on may alternatively be determining, by using a message sent by the cloud server, whether the display screen of the second electronic device is on. For example, because the first electronic device and the second electronic device are logged in to a same device account, the cloud server can collect some device information such as display screen information (such as whether screens are off and sizes), memory capacities, and device hardware/software version information of the two electronic devices. The first electronic device can request the cloud server to execute a query and return information about the display screen of the second electronic device. The cloud server executes the query and returns a message to the first electronic device. In this way, the first electronic device can determine whether the display screen of the second electronic device is on, and determine whether to send the image to the second electronic device. In this embodiment of this application, the first electronic device sends the captured image to the second electronic device only when the display screen of the second electronic device is on.

In some other embodiments of this application, the first electronic device may further transmit, in addition to the captured image, the device information of the first electronic device such as a device version and a device name of the first electronic device to the second electronic device. In terms of technical implementation, the first electronic device may send image information to the second electronic device, where the image information may include the captured image and the device information. After receiving the image information, the second electronic device may display both the image and the device information on the display screen. For example, when displaying the image, the second electronic device may further display information related to the device information of the first electronic device. As shown in FIG. 10A, in addition to an image 1001, a prompt box 1002 is displayed on the display screen of the second electronic device, and the prompt box 1002 indicates that the image comes from the first electronic device. In this way, a user of the second electronic device knows who transmits the image.

A specific technical solution used in this embodiment of this application is described below in detail based on the foregoing embodiments of the image sharing method.

Two or more electronic devices are used in this embodiment of this application. For example, in this embodiment, descriptions are provided by using an example of two electronic devices, namely, a first electronic device 101 and a second electronic device 103. The first electronic device 101 may be a mobile phone having the hardware structure in FIG. 3, and the second electronic device 103 may be a tablet computer having the hardware structure in FIG. 3.

Figure 5:
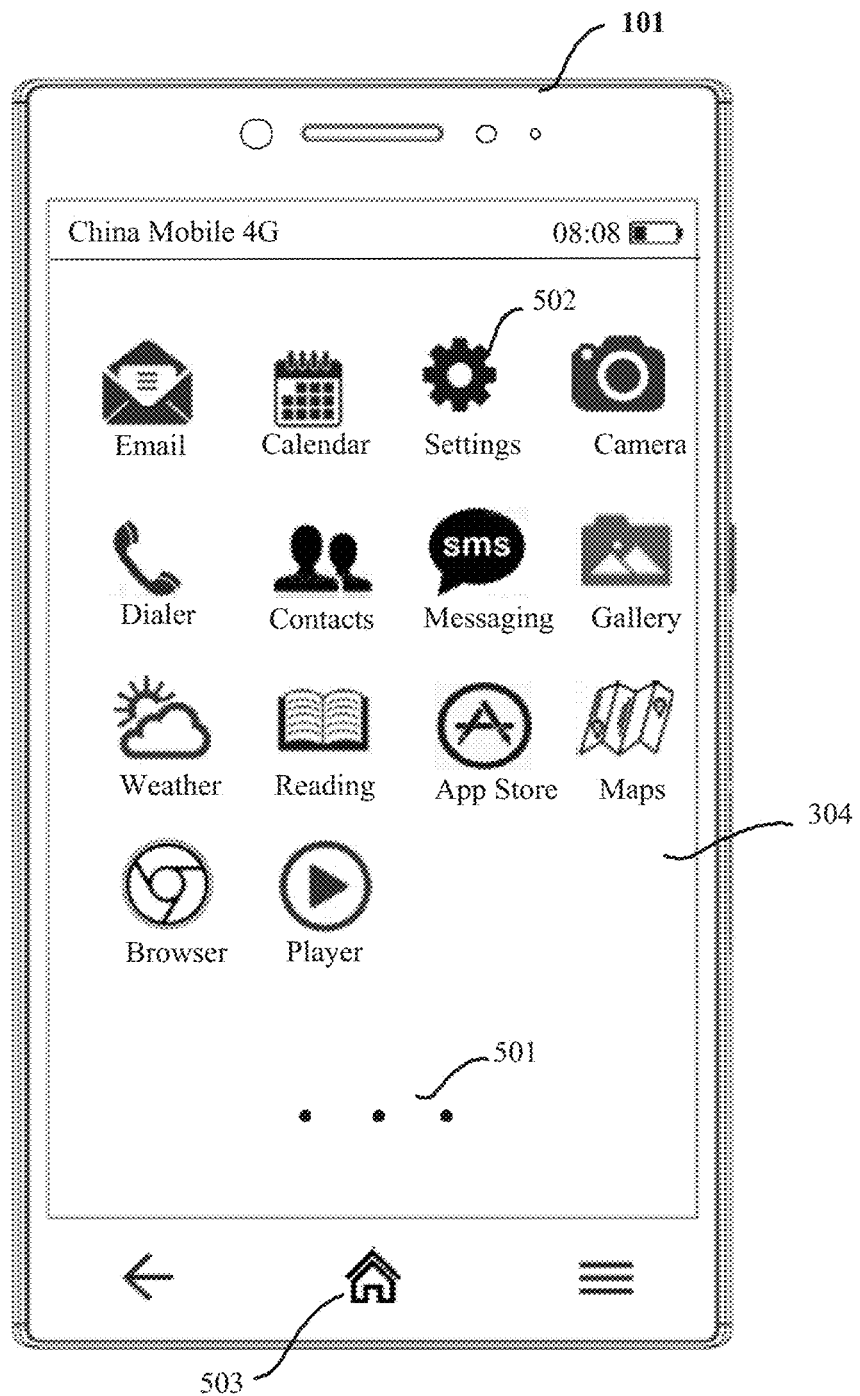
FIG. 5 is a schematic diagram of a graphical user interface displayed on an electronic device according to some embodiments.
Figure 6A:
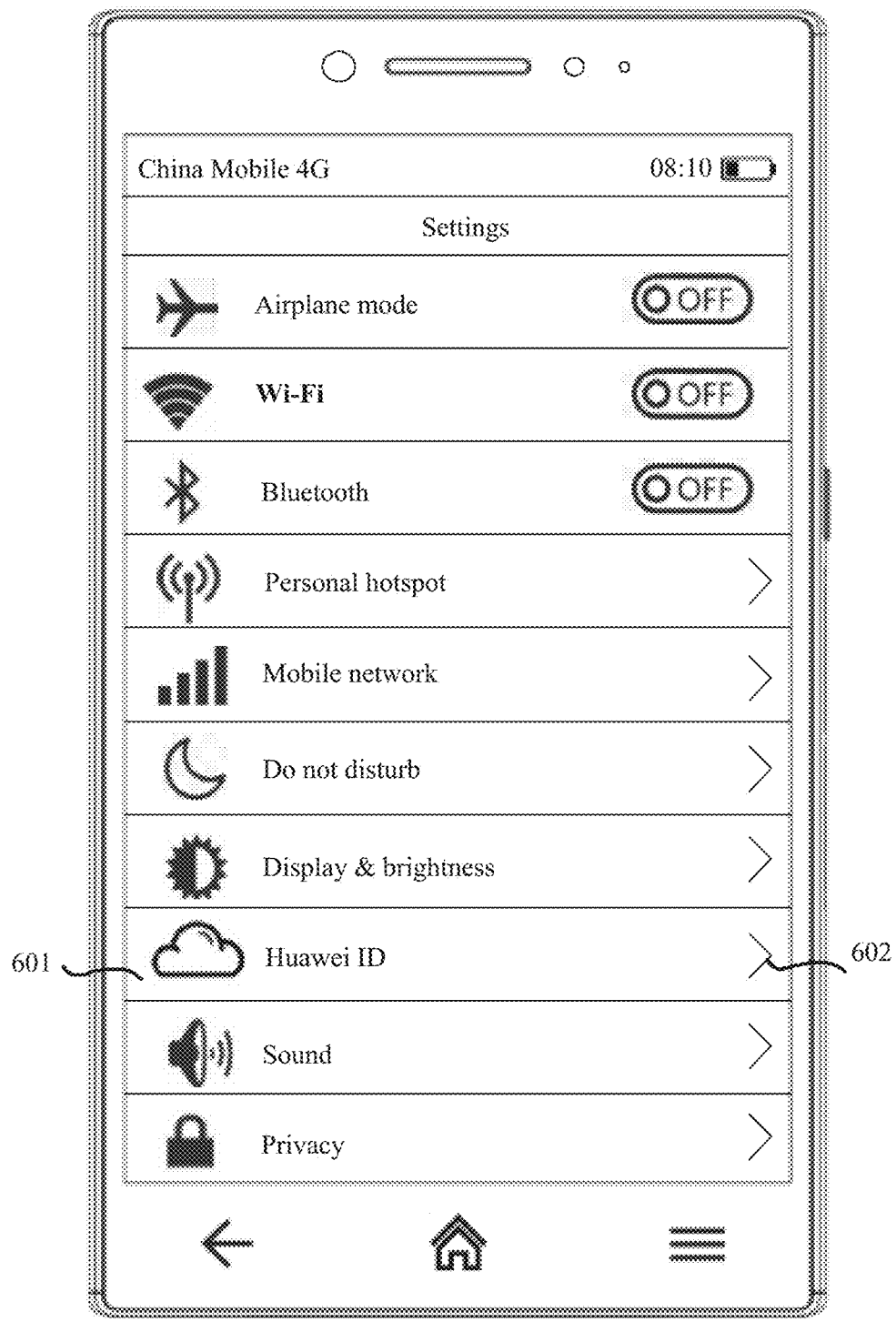
FIG. 6A to FIG. 6D are schematic diagrams of some other graphical user interfaces displayed on an electronic device according to some other embodiments.
Figure 6B:
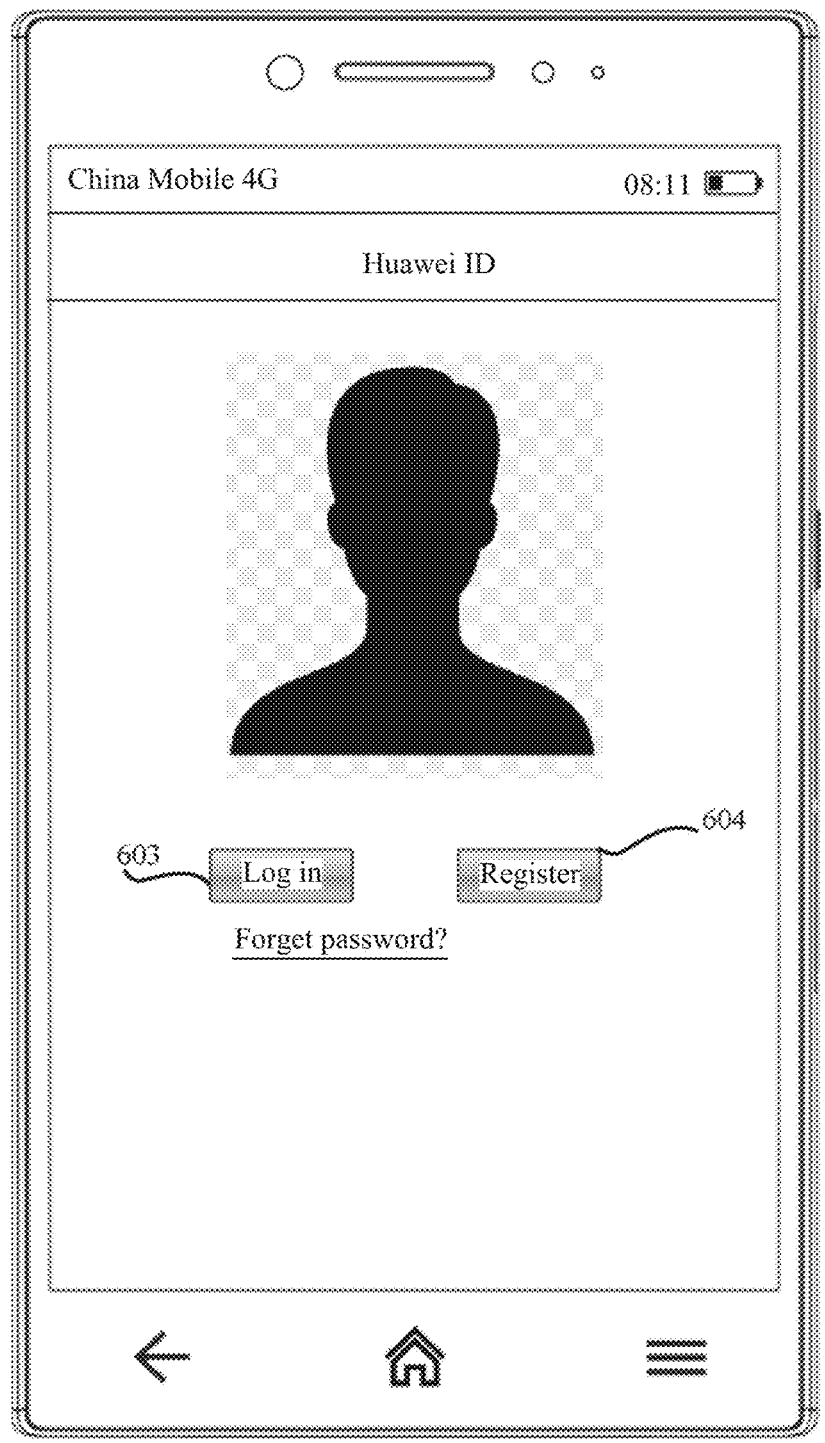
Figure 6C:
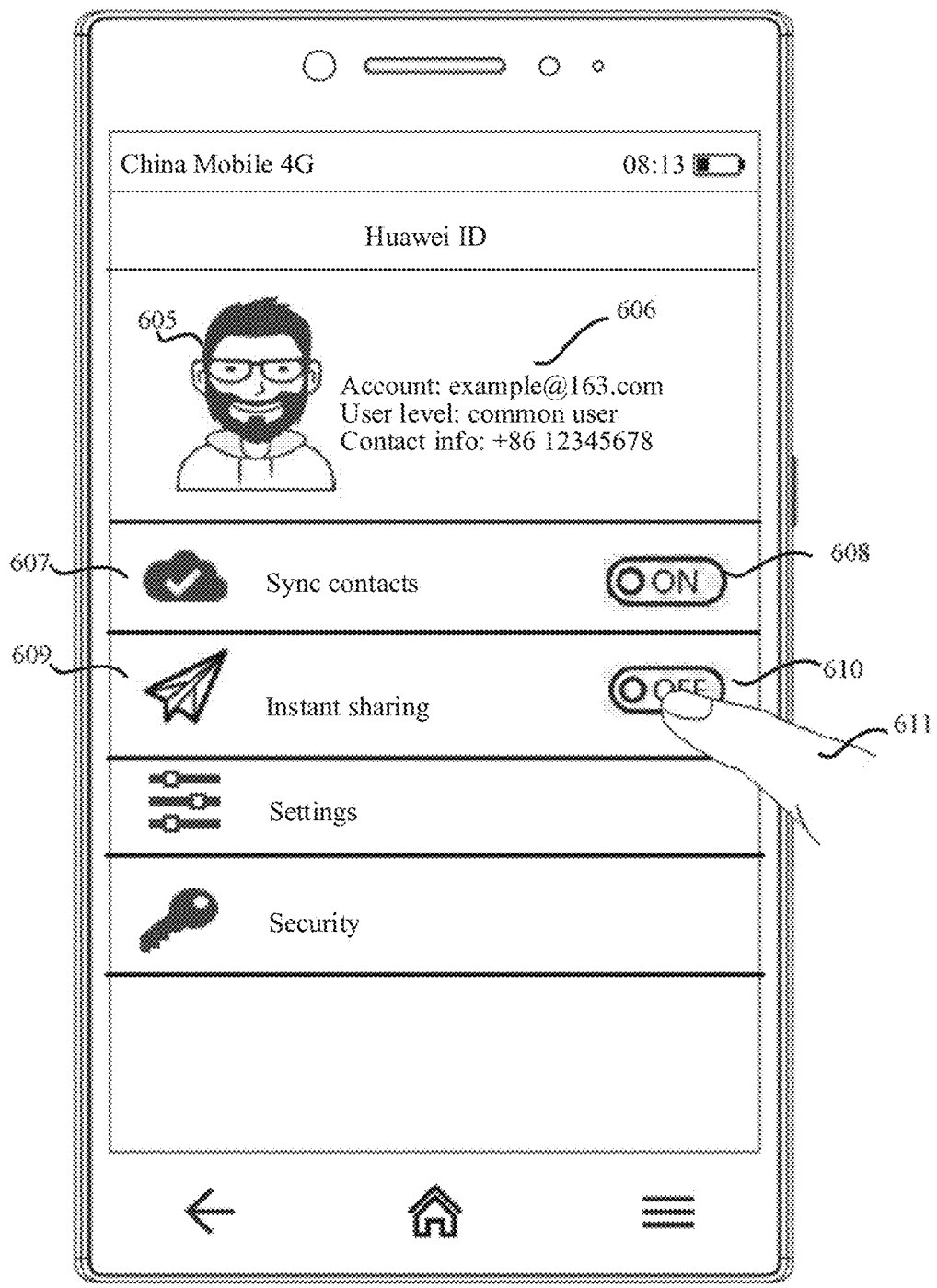

In some embodiments of this application, both the first electronic device 101 and the second electronic device 103 need to be logged in to a particular device account before some functions of the electronic devices can be used. For example, functions of contacts synchronization and instant sharing can be used only after the first electronic device is logged in to a Huawei ID, and the functions cannot be used when the first electronic device is not logged in to a Huawei ID. It may be the same as the second electronic device 103. Using the first electronic device 101 as an example, as shown in FIG. 5, an icon 501 indicates that three interfaces of the first electronic device 101 are used for displaying various application programs, shortcuts, and widgets (widget). A currently displayed interface is a main interface. The main interface may be displayed by using a finger of a user to touch a key 503. The key 503 may be a virtual key on a touchscreen 304, or may be a physical key. The main interface may alternatively be displayed by using a finger to slide on a touchscreen 304 The finger of the user may touch settings represented by an icon 502. In response to such a touch event, the first electronic device displays a graphical user interface (GUI for short below) on the touchscreen 304, as shown in FIG. 6A. In FIG. 64, menu options such as Airplane mode, Wi-Fi, and Mobile network related to settings are displayed. None of Airplane mode, Wi-Fi, and Bluetooth is enabled or turned on. A menu option 601 indicates a menu option related to a Huawei ID. The user may enter a specific interface of the menu option 601 by touching an icon 602, or enter the menu option by touching any area. in the menu option 601. As shown in FIG. 6B, on the GUI, if the user already has a Huawei ID, the user may click a virtual button 603 and enter an account and a password for login. The electronic device sends related data to a cloud server on a network side. If the user does not have a Huawei ID, the user may click a virtual button 604 and enter registration information on another interface, to complete registration of a Huawei ID. After authentication succeeds on the cloud cloud server, the cloud server returns data to the electronic device, and information related to the Huawei ID into which the electronic device is logged is then displayed on the electronic device, as shown in FIG. 6C. In FIG. 6C, the displayed GUI includes a user profile picture 605 and account information 606 (including a device account ID, a user level, contact info, and the like) of the account. The GUI further displays some common setting menu options. For example, a menu option 607 indicates a function menu option for contacts synchronization A virtual button 608 indicates that a function of the contacts synchronization is currently enabled. For another example, the GUI displays a menu option 609. The menu option 609 indicates a function of instant sharing (Instant Sharing). A virtual button 610 indicates that the function of instant sharing is disabled.

In this application, the function of instant sharing means that, after the user uses an electronic device to shoot a picture, record a video, or capture a screenshot, the electronic device can immediately share the collected picture, video, or screenshot with another electronic device. Therefore, it can be understood that, in this embodiment of this application, "instant" means that a. time interval between an action of obtaining the image (the picture, video, or screenshot) and an action of sending the image to the another electronic device is very short, and may be measured in microseconds. In addition, between the two actions, there may be no action performed based on a user input. In addition, it can be understood that, although in this application, a name of the menu option 609 is "Instant sharing", the name does not constitute a limitation on this application. In another embodiment of this application, the name of the menu option 609 may be another name such as "Immediate sharing".

Figure 6D:
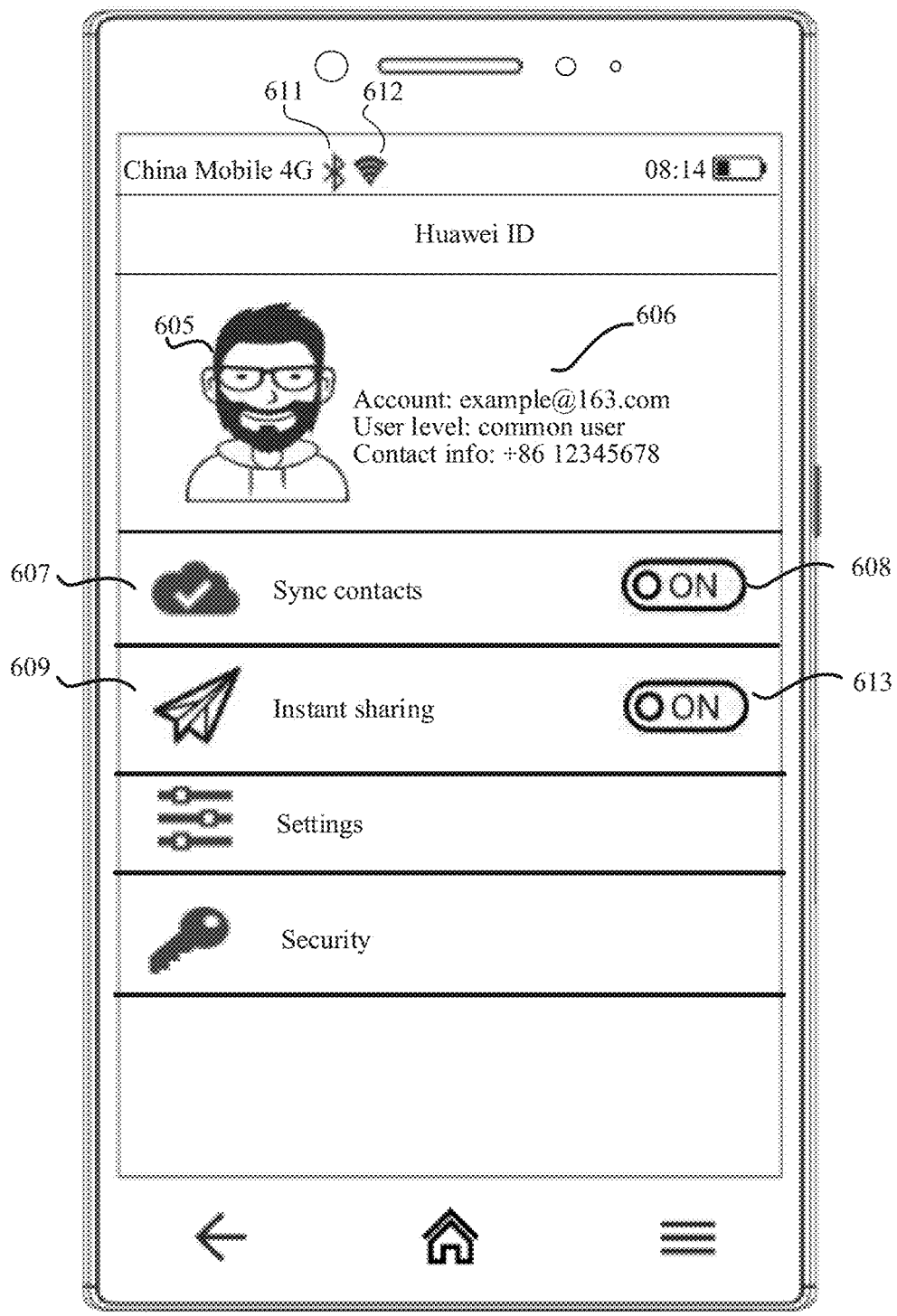

As shown in FIG. 6C, when a finger of the user 611 clicks a virtual button 610, the function of instant sharing is enabled. As shown in FIG. 6D, the virtual button 610 in FIG. 6C is changed into a virtual button 613. The virtual button 613 indicates that the function of instant sharing is enabled. In addition, Bluetooth or Wi-Fi is enabled. Corresponding symbols 611 and 612 can be seen in a status bar of the electronic device. A Bluetooth apparatus of the electronic device starts to search for and pair with another electronic device whose Bluetooth is also enabled, and then a Bluetooth link is established between the two electronic devices. In addition, the Bluetooth apparatus works in a master mode, and the another electronic device works in a slave mode. The master mode and the slave mode are both terms in a Bluetooth technology, and are not described in detail in this specification. Processes such as the searching and pairing may be performed in a manner that is not perceptible to the user. Alternatively, the user may actively use a related GUI to select another related electronic device to perform the pairing and establish the Bluetooth link. In addition, the Bluetooth apparatus may further establish a Bluetooth link to another electronic device. Technically, the Bluetooth apparatus may simultaneously communicate with at most seven Bluetooth slave devices. Links established between the electronic device and other electronic devices by means of Bluetooth may form a small wireless local area network. In some other embodiments of this application, when the electronic device establishes a Bluetooth link to another electronic device, the user may be prompted in a manner perceptible to the user. For example, "Bluetooth connection to Bluetooth device A is established." is displayed on the touchscreen.

When the function of instant sharing is enabled, a apparatus of the electronic device may also be turned on, and the Wi-Fi apparatus starts to search for a Wi-Fi signal broadcast by a Wi-Fi wireless access point. After a series of procedures and operations, the electronic device can access the Wi-Fi wireless access point and establish a Wi-Fi link to the Wi-Fi wireless access point. It can be understood that, establishing of a wireless link between electronic devices by means of Bluetooth may be considered as a handshake between the electronic devices, and indicates that the electronic devices trust each other. When an electronic device accesses a Wi-Fi network, it indicates that the electronic device can send an image to another electronic device at any time by using the network.

Figure 7A:
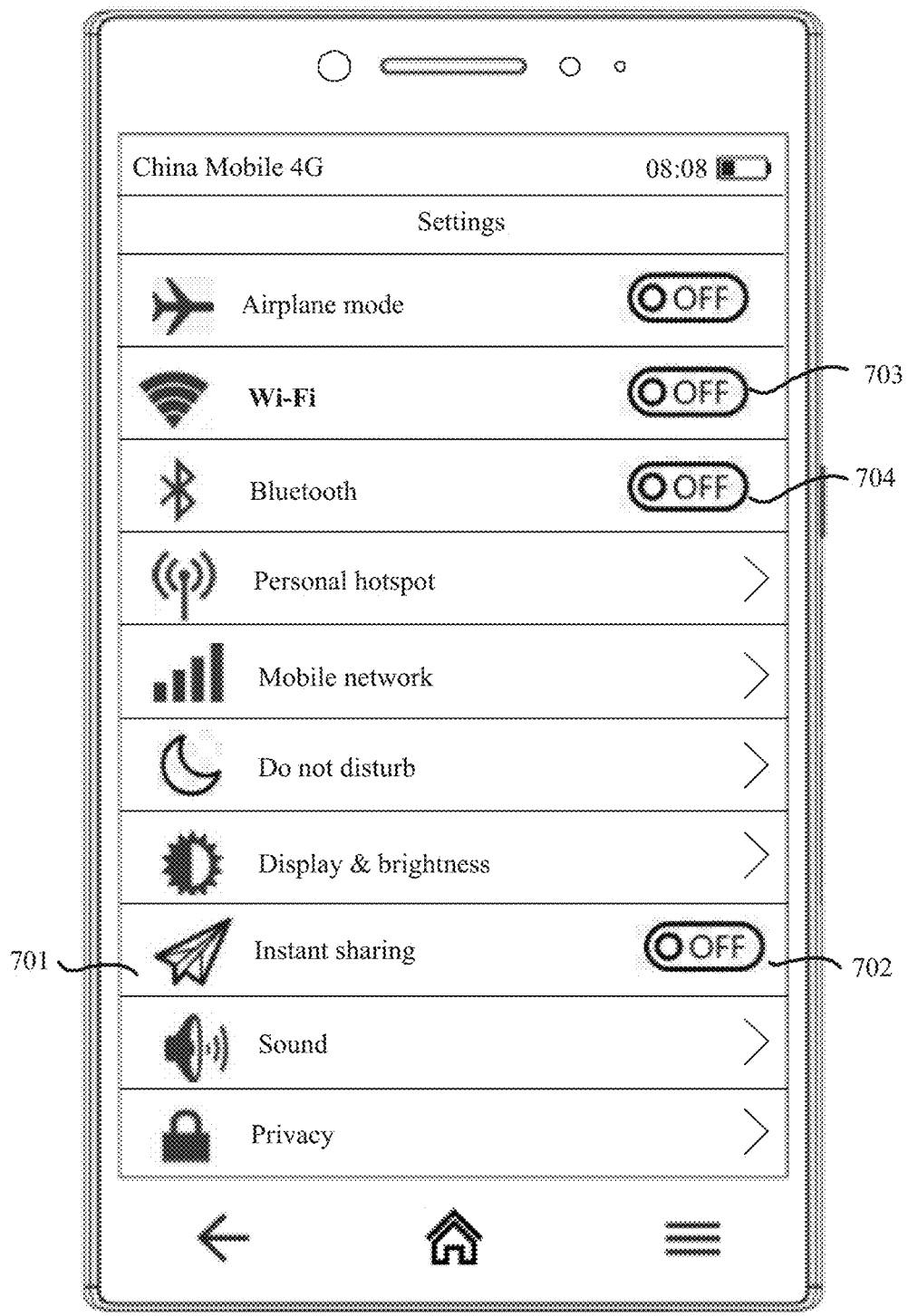
FIG. 7A and FIG. 7B are schematic diagrams of some other graphical user interfaces displayed on an electronic device according to some other embodiments.
Figure 7B:
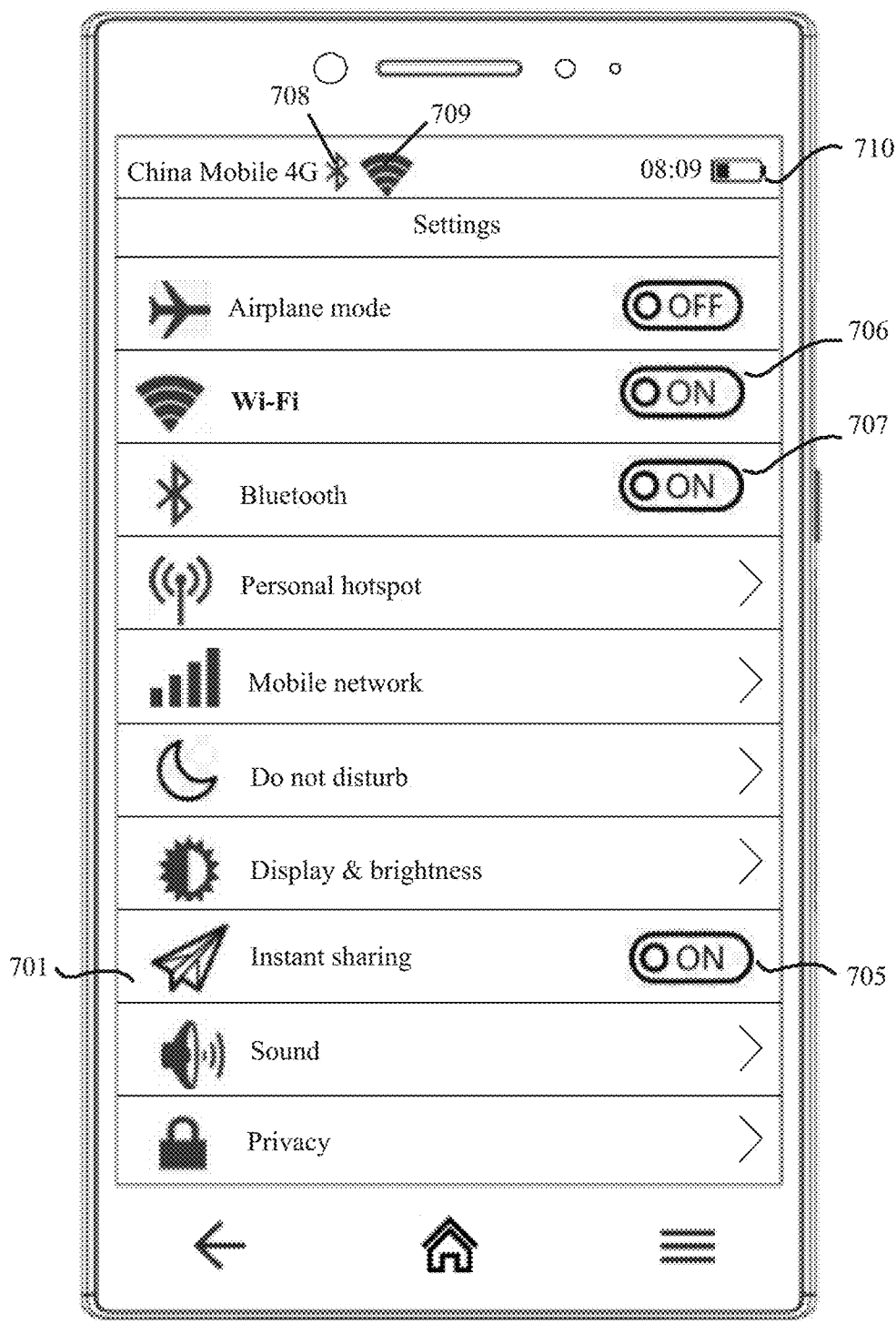

It can be learned from FIG. 6A to FIG. 6D that, a precondition for enabling or disabling a function of instant sharing of the first electronic device 101 is that, the first electronic device 101 is already logged in to a related device account such as the foregoing Huawei ID. The device account that is logged in to has a submenu for the instant sharing. It can be understood that, in another embodiment of this application, the function of instant sharing of the first electronic device may alternatively be enabled or disabled without logging the first electronic device into a related device account. FIG. 7A is a GUI of settings that is opened after a finger of the user clicks Settings 502 in FIG. 5. On the GUI, a menu of settings is displayed. A menu option 701 is a menu option for instant sharing, and a virtual button 702 indicates that a function of instant sharing is disabled. In addition, a Wi-Fi function is also disabled, as shown by a virtual button 703, and Bluetooth is also disabled, as shown by a virtual button 704. The first electronic device detects a touch operation of the finger of the user on the touchscreen. As shown in FIG. 7B, in response to the touch operation, the virtual button 702 is changed into a virtual button 705. The virtual button 705 indicates that the function of instant sharing is enabled. In addition, the Wi-Fi function is also enabled (as shown by a virtual button 706), and Bluetooth is also enabled (as shown by a virtual button 707). In addition, a symbol 708 of Bluetooth may be displayed in a status bar 710, and a symbol 709 of Wi-Fi may be displayed in the status bar 710. In this way, the function of instant sharing can be enabled or disabled without logging the first electronic device into a related device account.

In this embodiment of this application, after the function of instant sharing is enabled, when the first electronic device 101 captures an image (for example, a photo or a video shot by the user by using a front-facing/rear-facing camera, or a screenshot obtained by the user by performing a particular operation), the first electronic device 101 may determine whether a display screen of the second electronic device 103 is on. If determining that the display screen of the second electronic device 103 is on, the first electronic device 101 transmits the captured image to the second electronic device 103 over a wireless link (such as a Bluetooth link or a Wi-Fi link). If determining that the display screen of the second electronic device 103 is off, the first electronic device may not transmit the image to the second electronic device 103. A specific method for the first electronic device 101 to determine whether the display screen of the second electronic device 103 is on may be that the second electronic device 103 actively feeds back current device status information such as whether the screen is off, a memory capacity, and device hardware/software version information to the first electronic device 101. The first electronic device 101 then determines, based on the device status information fed back by the second electronic device 103, whether the display screen of the second electronic device 103 is on. In some other embodiments of this application, the method for the first electronic device 101 to determine whether the display screen of the second electronic device 103 is on may alternatively be determining, by using a message sent by the cloud server, whether the display screen of the second electronic device 103 is on. For example, because the first electronic device 101 and the second electronic device 103 are logged in to a same device account, the cloud server can collect some device information such as display screen information (such as whether screens are oft and sizes), memory capacities, and device hardware/software version information of the two electronic devices. The first electronic device 101 can request the cloud server to execute a query and return information about the display screen of the second electronic device 103. The cloud server executes the query and returns a message to the first electronic device 101. In this way, the first electronic device 101 can determine whether the display screen of the second electronic device 103 is on, and determine whether to send the image to the second electronic device 103. In this embodiment of this application, the first electronic device 101 sends the captured image to the second electronic device 103 only when the display screen of the second electronic device 103 is on. In some other embodiments of this application, if a user is watching a video, typing a text, or performing another operation on an electronic device whose screen is on, a notification indicating that someone is sharing an image is displayed in a notification bar. The image can be displayed on the display screen of the electronic device only after the user clicks the notification.

In the embodiment, the operation of determining, by the first electronic device 101, whether the display screen of the second electronic device 103 is on may alternatively be performed after Bluetooth or Wi-Fi is enabled and before the first electronic device 101 captures the image. In this way, instant sharing is performed more quickly and more efficiently after the user shoots a picture.

It can be understood that, in another embodiment of this application, the first electronic device 101 may alternatively transmit, without determining whether the display screen of the second electronic device 103 is on, an image to the second electronic device 103 after capturing the image, so that the second electronic device 103 saves the image quickly and in time. In addition, in this embodiment, after the image is transmitted to the second electronic device 103, the second electronic device 103 may perform different processing on the image based on a status of the second electronic device 103. For example, when determining that the display screen is not on, the second electronic device 103 may save the image in a memory, and then display the image on the display screen when the display screen is on. For another example, after receiving the image, the second electronic device 103 may first determine whether the display screen is on, and display the image on the display screen if the display screen of the second electronic device 103 is on, or skip saving the image if the display screen is not on.

In some other embodiments of this application, after the function of instant sharing is enabled, when the first electronic device 101 captures an image (for example, a photo or a video shot by the user by using a front-facing/rear-facing camera, or a screenshot obtained by the user by performing a particular operation), the first electronic device 101 may first determine whether a device account into which the second electronic device 103 is logged is the same as a device account into which the first electronic device 101 is logged. A picture or a video on the first electronic device can be instantly shared with the second electronic device 103 by using a wireless link (such as a Bluetooth link or a Wi-Fi link) only when it is determined that the device account into which the second electronic device 103 is logged is the same as the device account into which the first electronic device 101 is logged. In this way, accuracy of the picture/video sharing is ensured, thereby further ensuring privacy and security of data on the first electronic device 101. Specifically, the first electronic device 101 may determine, after establishing a Bluetooth connection to the second electronic device 103, that the device account on the second electronic device is the same as the device account on the first electronic device. If determining that the device accounts on the second electronic device and the first electronic device are the same, the first electronic device enables (or turn on) the function of instant sharing. In this way, after capturing an image, the first electronic device 101 sends the captured image to the second electronic device 103 over the wireless link without prompting the user.

Figure 12:
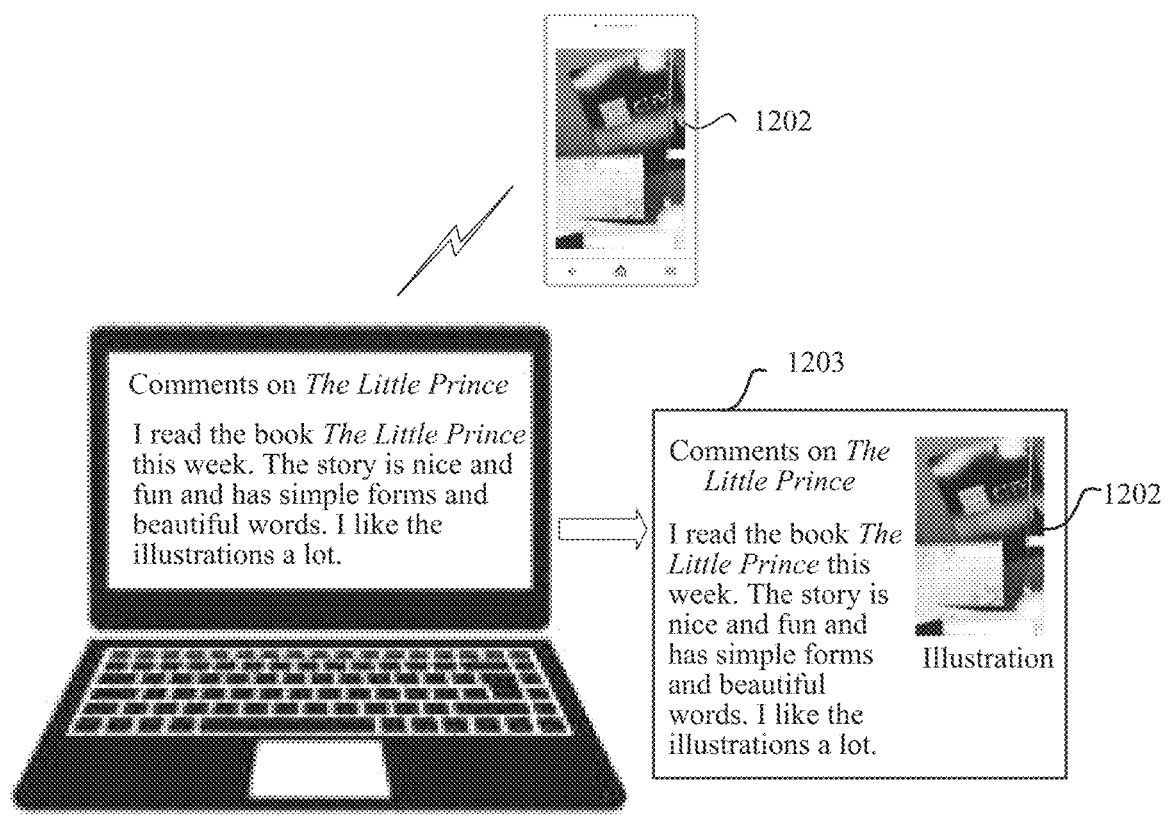
FIG. 12 is a schematic diagram of displaying an image on a display screen of a portable computer according to some embodiments.

In some other embodiments of this application, after the function of instant sharing is enabled, when the first electronic device 101 captures an image (for example, a photo or a video shot by the user by using a front-facing/rear-facing camera, or a screenshot obtained by the user by performing a particular operation), the first electronic device 101 may determine whether the display screen of the second electronic device 103 is on, and may further determine whether a device account into which the second electronic device 103 is logged is the same as a device account into which the first electronic device 101 is logged. When the first electronic device 101 determines that the display screen of the second electronic device 103 is on, and the device account into which the second electronic device 103 is logged is the same as the device account into which the first electronic device 101 is logged, the first electronic device 101 sends, over the wireless link, the captured image to the second electronic device 103 whose display screen is on. The foregoing solution can ensure the accuracy of the image (picture, video, or the like) sharing, thereby further ensuring the privacy and security of data on the first electronic device. The technical solution in this embodiment may be applied to the following scenarios:

Scenario 1: A user has two electronic devices, for example, a mobile phone and a portable computer, on which a same device account is logged in to. The mobile phone and the portable computer establish a Bluetooth link by means of Bluetooth, and establish Wi-Fi links to a same Wi-Fi wireless access point. In this case, the user may be at home, or in an office, or in a coffee shop. The user is writing an article about comments on *The Little Prince* on the portable computer, and now needs to add a picture to the article as an illustration. Therefore, the user uses the mobile phone to shoot a photo, and the photo is immediately displayed on a display screen of the portable computer. In this way, the user can almost simultaneously see the photo on the display screen of the portable computer, and can immediately perform editing or other processing on the photo. In some other embodiments of this application, the photo can be displayed at a particular location on the display screen. For example, the photo can be inserted at a particular location in the article, as shown in FIG. 12. In FIG. 12, before the user shoots the photo by using the mobile phone, some content 1201 (such as text and multimedia) of comments is displayed on the display screen of the portable computer. After the user shoots the photo by using the mobile phone, the photo 1202 is instantly transmitted to the portable computer. A symbol 1203 in FIG. 12 shows specific details of the article displayed on the display screen of the portable computer. The photo 1202 is inserted and displayed in the current article on the portable computer, and a photo description can be automatically added below the photo (for example, a similar description such as "Illustration" or "The photo comes from the mobile phone of the user" is added). In addition, because a photo is inserted in the article, typesetting of the article is changed. The portable computer can automatically typeset and display the article based on a size and a shape of the photo. In this way, a capability of intelligent interaction of an electronic device is greatly improved, and document processing efficiency of the user is increased.

In some other embodiments of this application, after a document (such as a WORD document) is edited, the portable computer may automatically send the edited document to the mobile phone of the user over a wireless link, or may ask, after editing is completed, the user whether to send the document to the mobile phone to facilitate confirmation by the user. According to the foregoing solution, the user can handle one thing through coordination of different electronic devices. In this way, processing efficiency of the electronic devices is increased.

Scenario 2: A plurality of (two or more) electronic devices (such as a mobile phone, a tablet computer, and a portable computer) are all at home. For example, an electronic device A is in a bedroom, an electronic device B is in a living room, and an electronic device C is in a kitchen, but the electronic devices are close to each other. The electronic devices A, B, and C are logged in to a same device account. That is, the electronic devices are different electronic devices owned by a same user. In addition, the plurality of electronic devices all establish wireless connections to a same Wi-Fi wireless access point. That is, the plurality of electronic devices can form a wireless local area network by using the Wi-Fi wireless access point. In the scenario, a function of instant sharing is enabled on the electronic device A. When the user uses a camera of the electronic device A to capture an image, the image may be transmitted, over a Wi-Fi link, to the electronic device B whose screen is on, and the image is immediately displayed on the screen of the electronic device B. However, because a screen of the electronic device C is off, the image is not transmitted to the electronic device C. The electronic device B whose screen is on indicates that the electronic device B is being used by a family member or a friend of the user, and the electronic device C whose screen is off indicates that the electronic device is currently not being used by any person. Therefore, the electronic device A transmits the captured image to the electronic device B whose screen is on. In this way, the user can immediately share the obtained image (such as a photo or a video) with the family member/friend, thereby improving user experience.

Figure 8A:
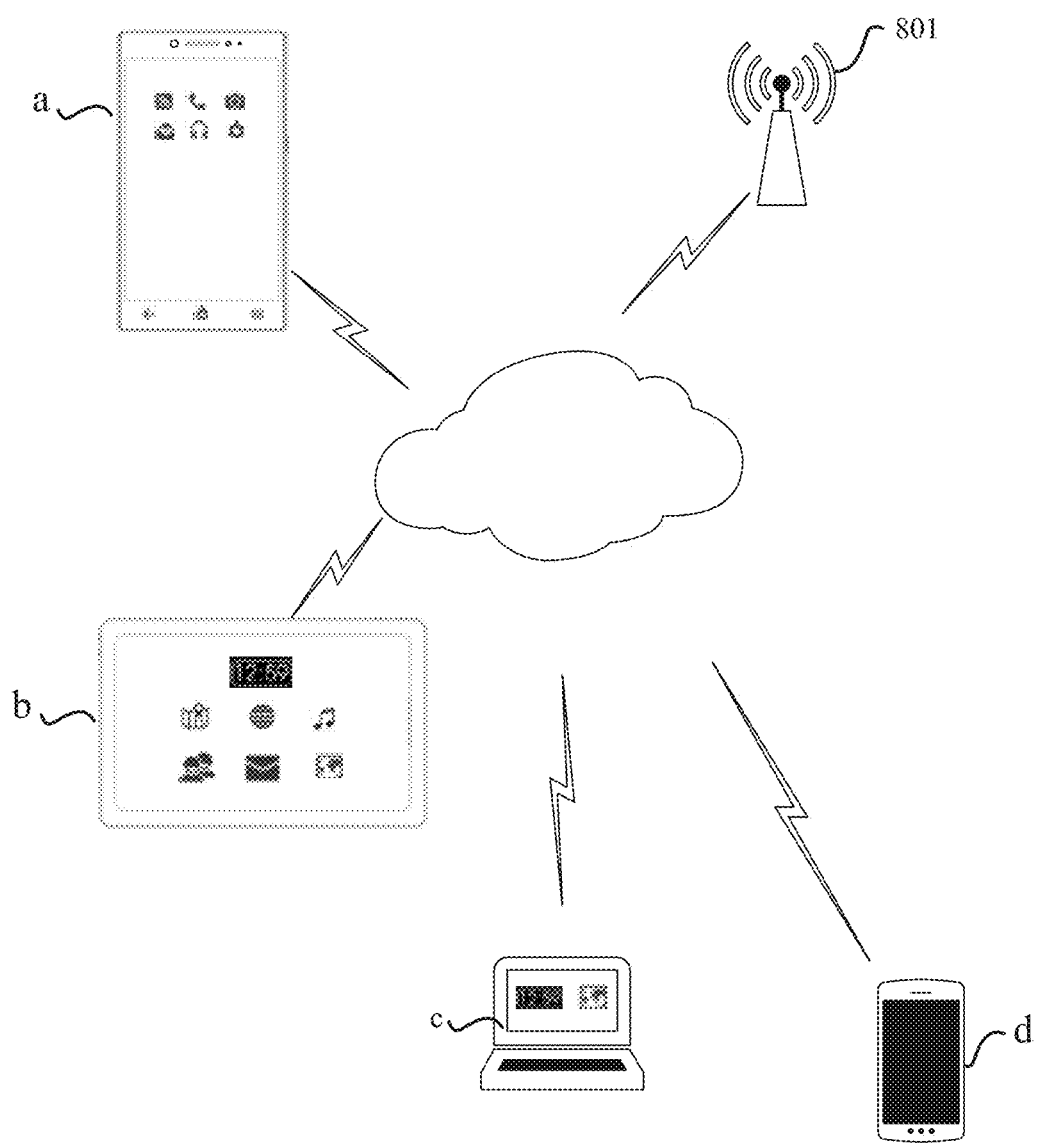
FIG. 8A and FIG. 8B are schematic diagrams of use scenarios for electronic devices according to some other embodiments.
Figure 8B:
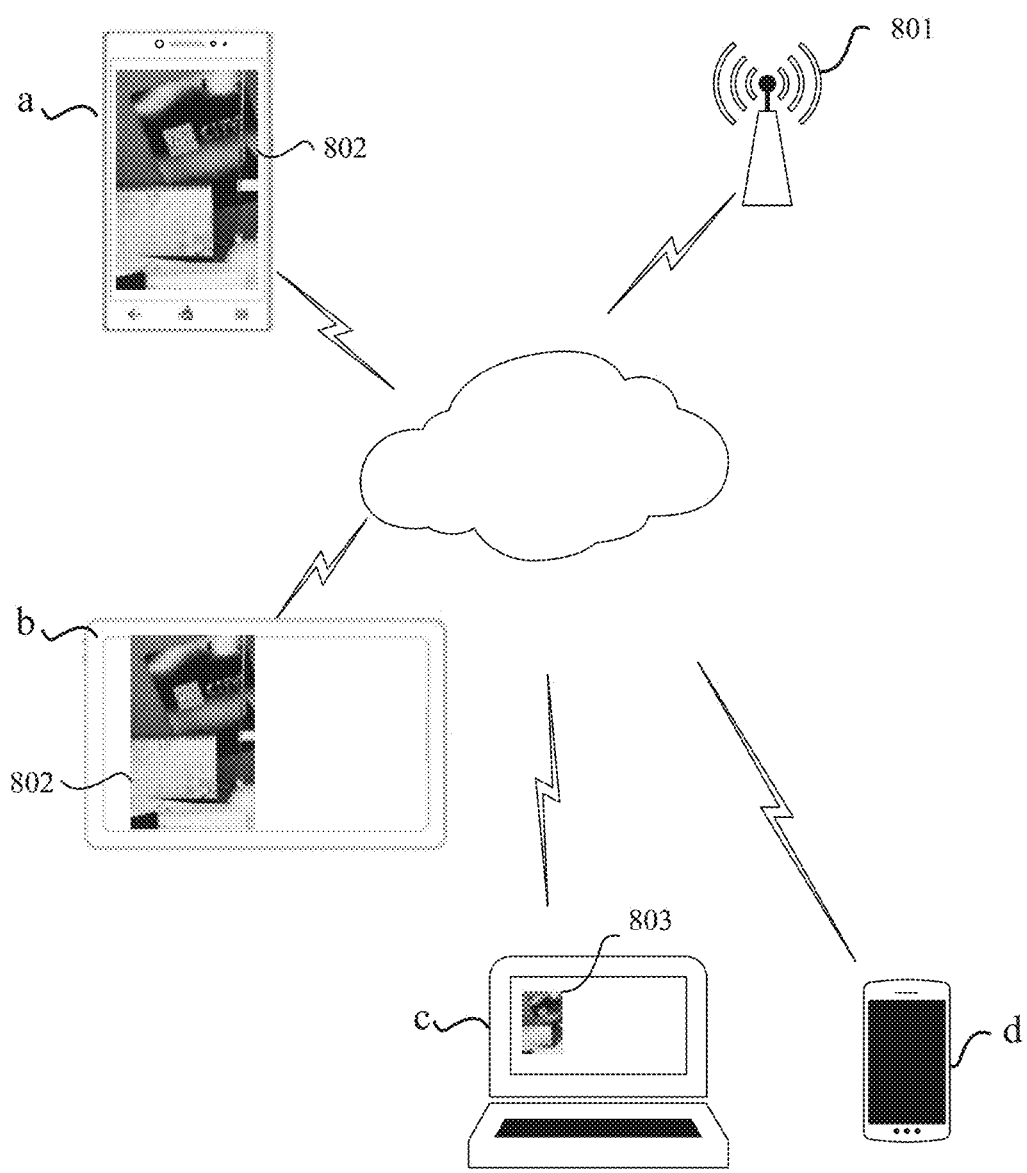

With reference to the foregoing embodiments, in some other embodiments of this application, after a function of instant sharing is enabled, the first electronic device may further transmit images having different sizes and resolutions to other electronic devices based on distances between the other electronic devices and the first electronic device. The first electronic device may determine the distances between the other electronic devices and the first electronic device by using a method, for example, a method based on detected strength of Bluetooth signals of the other electronic devices, or a method based on strength of Wi-Fi signals of the other electronic devices. It can be understood that, the distances between the other electronic devices and the first electronic device may alternatively be determined by using another method different from the foregoing methods. This is not limited in this embodiment. As shown in FIG. 8A, it is assumed that, an electronic device a is a first electronic device 101 whose function of instant sharing is enabled, and electronic devices a to d are all connected to a same Wi-Fi wireless access point. The electronic device a may determine distances between other electronic devices b, c, and d and the electronic device a by using the foregoing methods. It can be learned from FIG. 8A that, the electronic device h is closest to the electronic device a, the electronic device c is second closest to the electronic device a, and the electronic device d is farthest from the electronic device a. Then, after the electronic device a uses a camera to capture an image 802, the image may be transmitted to another electronic device over a Wi-Fi link. Specifically, because the electronic device b is closest to the electronic device a, the electronic device a can transmit the captured image with an original size to the electronic device b. In this case, a screen of the electronic device b may be on, and the image may be displayed on the screen. As shown in FIG. 8B, the image 802 is displayed on the screen of the electronic device b. The electronic device d is farthest from the electronic device a, and a screen of the electronic device d is off. In this case, the electronic device a may not send the image to the electronic device d. The electronic device a may send an image 803 with a low resolution to the electronic device c based on a distance between the electronic device c and the electronic device a, and the image is immediately displayed on a screen of the electronic device c. According to the method in this embodiment, an electronic device farther from the electronic device a indicates a smaller size and a lower solution of a transmitted picture. A smaller distance between the another electronic device and the electronic device a may indicate higher intimacy between a user of this electronic device and a user of the electronic device a, and a picture with a higher resolution may be transmitted by the electronic device. According to the foregoing instant sharing method, image sharing between electronic devices can be more intellectual, thereby improving sharing efficiency, and further improving user experience.

In some other embodiments of this application, the electronic device a may sequentially transmit an image to the other electronic devices based on different distances. For example, the electronic device a may first transmit a captured image to the electronic device b closest to the electronic device a, and lastly transmit the image to the electronic device d farthest from the electronic device a. In this way, a benefit is that, for a Wi-Fi local area network, fewer network resources are wasted at a same moment. In addition, intimacy between a user of the electronic device b closet to the electronic device a and the user of the electronic device a is the highest. Therefore, the electronic device b can most quickly obtain the image sent by the electronic device a, so that it can be ensured that the electronic device b quickly obtains, in a timely manner, the image shot by the electronic device a. In some other embodiments of this application, if a relative distance between an electronic device and the electronic device a is changed (that is, a location of the electronic device is changed), the electronic device a may determine, based on the new distance, how to transmit the image.

Figure 9:
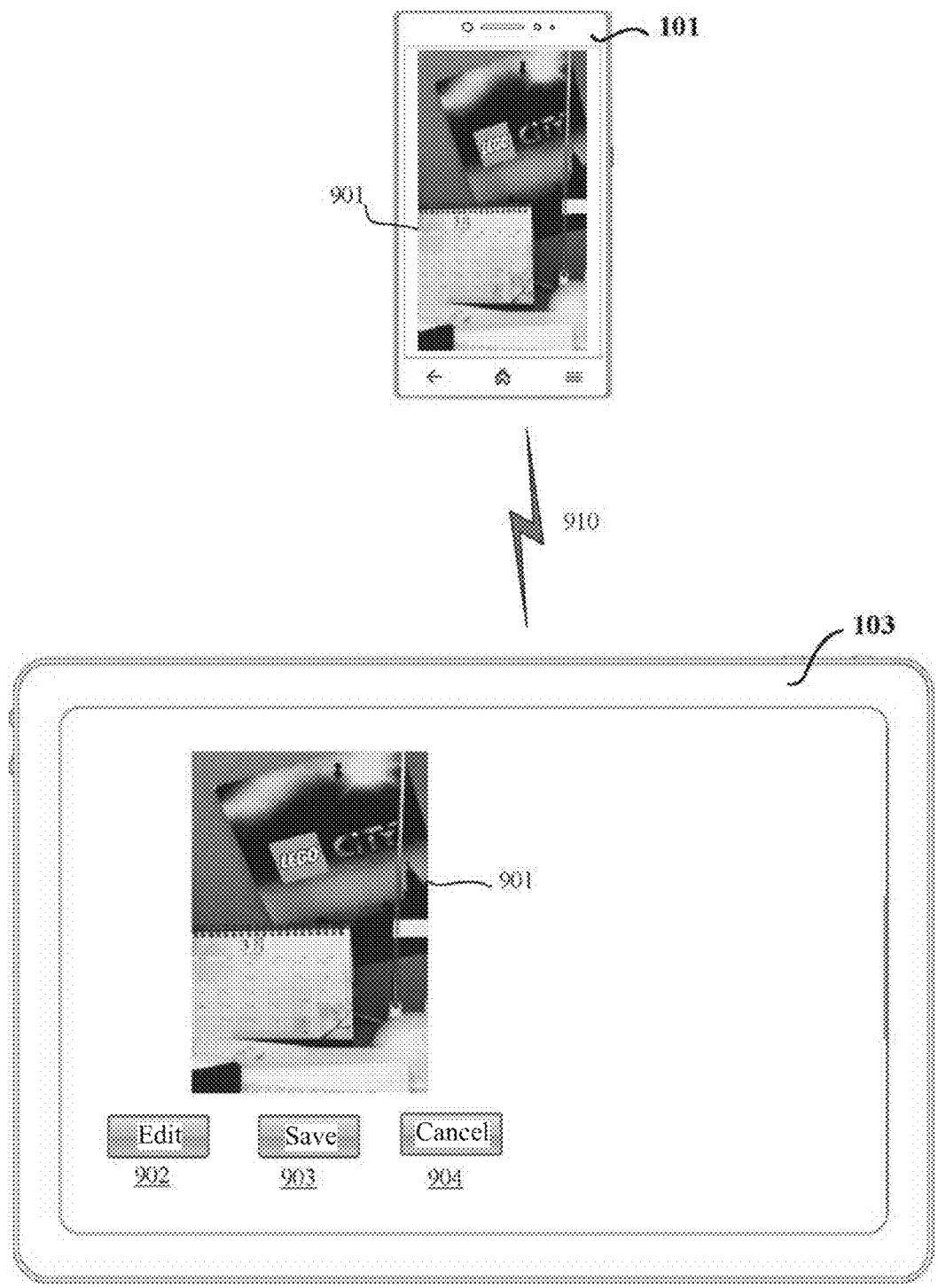
FIG. 9 are some graphical user interfaces on display screens of a first electronic device and a second electronic device according to some embodiments.

As shown in FIG. 9, the first electronic device 101 (which may be the electronic device a, the electronic device A, or the like) may transmit a captured image 901 to the second electronic device 103 (which may be the electronic device b, the electronic device B, or the like) over a wireless link 910, and the image 901 is displayed on the display screen of the second electronic device 103. In FIG. 9, the image 901 transmitted from the first electronic device 101 is displayed on the display screen of the second electronic device 103. The image may be displayed on the display screen in a floating manner, and some common virtual buttons, such as Edit 902, Save 903, and Cancel 904, for operating the image may be displayed below the image. "Edit" indicates that, after receiving a touch operation of the user on the virtual button 902, in response to the touch operation, the second electronic device may display an editing-related GUI, so that the user can perform editing (such as color correction or cutting) on the image 901 transmitted by the first electronic device. "Save" indicates that, after receiving a touch operation of the user on the virtual button 903, in response to the touch operation, the second electronic device 103 may save, in a memory of the second electronic device 101, the image 901 transmitted by the first electronic device 101. It can be understood that, the memory may be a nonvolatile memory, such as a flash memory. "Cancel" indicates that, after receiving a touch operation of the user on the virtual button 904, in response to the touch operation, the second electronic device 103 may not save the image 901 instantly shared by the first electronic device 101, and stops displaying the image 901 on the display screen. In some other embodiments of this application, a display direction of the image may adapt to a size of the display screen of the second electronic device 103. In FIG. 9, a length direction of the displayed image 901 is the same as a width direction of the display screen of the second electronic device 103 (assuming that both the directions are the Y direction in a plane coordinate system). In this way, in terms of display manner, the image 901 cannot adapt to the display screen of the second electronic device 103. As shown in FIG. 10A, an image 1001 transmitted by the first electronic device 101 is displayed on the second electronic device 103, a length direction of the image 1001 is the same as a length direction of the display screen of the second electronic device 103 (assuming that both the directions are the Y direction in a plane coordinate system). In this way, a display direction of the image 1001 better adapts to the display screen of the second electronic device 103.

In some embodiments of this application, as shown in FIG. 10A, the image 1001 transmitted by the first electronic device 101 by means of Wi-Fi is displayed on the display screen of the second electronic device 103, and the image 1001 may be displayed on the display screen in a floating manner. If the second electronic device 103 does not receive, within a preset time (for example, five seconds), a touch operation of the user on (or near) the display screen, the previously displayed image 1001 stops being displayed on the display screen after the preset time. That is, the image is not saved in a cache. in some other embodiments, when the image 1001 is displayed, a prompt box may be further displayed on the display screen of the second electronic device 103. For example, a prompt box 1002 whose content is "The image comes from the first electronic device. The image will stop being displayed and will not be saved locally if there is no operation within five seconds." may be further displayed. The prompt box 1002 may inform the user of an electronic device that sends the image, or may inform the user of a result that occurs if no operation is performed within the preset time.

If the second electronic device 103 receives, within a preset time, a touch operation of the user on (or near) the display screen, the previously displayed image 1001 continues to be displayed on the display screen. This indicates that the image is stored in the cache of the second electronic device 103. The touch operation may be a touch operation of a finger 1003 of the user at any location on the display screen, or the touch operation may be a touch operation of a finger 1003 of the user on the image 1001, that is, the finger 1003 of the user touches a location at which the image 1001 is located. As shown in FIG. 10B, in response to the touch operation, the second electronic device 103 may further display two virtual buttons on the display screen: Edit 1004 and Save 1005. "Edit" means that, after receiving a touch operation of the user on the virtual button 1004, in response to the touch operation, the second electronic device 103 may display an editing-related GUI, so that the user can perform editing (such as color correction or cutting) on the image transmitted by the first electronic device 101. "Save" means that, after receiving a touch operation of the user on the virtual button 1005, in response to the touch operation, the second electronic device 103 may save the image 1001 in the memory of the second electronic device 103. The memory may be nonvolatile. According to the foregoing implementation, when the user is interested in the image, an electronic device can display more controls for the image, so that the user performs further processing, thereby improving a capability of intelligent interaction between the electronic device and the user, and improving user experience.

In some other embodiments of this application, after an image is edited, the second electronic device 103 may further send the edited image to the first electronic device 101 over the wireless link, or may ask, after editing, the user whether to send the image to the first electronic device 101 to facilitate confirmation by the user. According to the foregoing solution, the user can handle one thing through coordination of different electronic devices. In this way, processing efficiency of the electronic devices is increased.

Figure 10C:
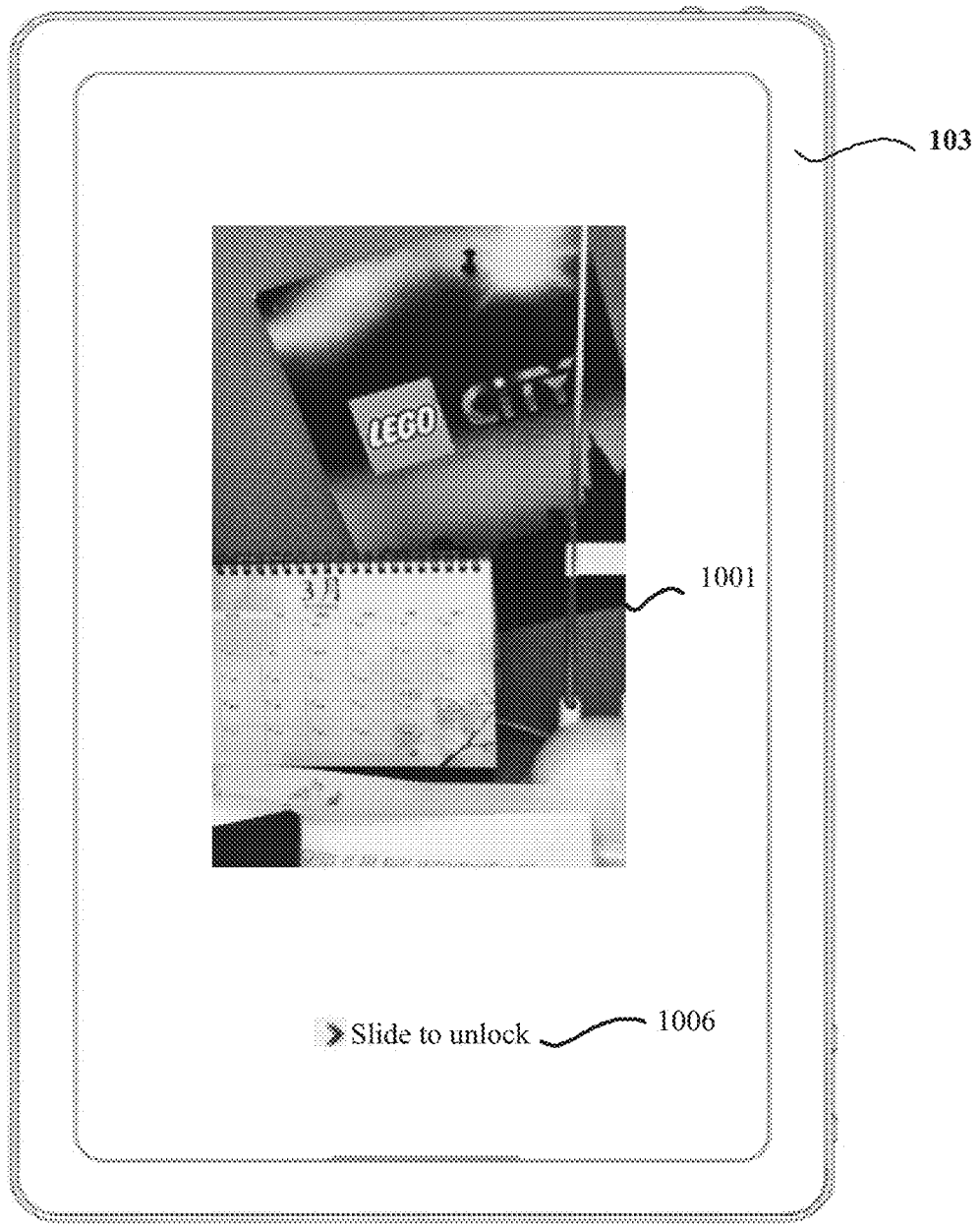

In some other embodiments of this application, the image transmitted by the first electronic device 101 may alternatively be displayed on a lock screen interface of the display screen of the second electronic device 103, as shown in FIG. 10C. In the figure, the display screen of the second electronic device 103 is on, and therefore, the image may be displayed on the display screen. A prompt box 1006 indicates that the lock screen interface is currently displayed on the display screen of the second electronic device 103, and the image 1001 is displayed on the lock screen interface. After the user performs slide unlocking, the image 1001 may not be displayed on the display screen, because after seeing the image 1001, the user does not perform any operation (such as touching) on the image 1001, but touches the prompt box 1006 to unlock the display screen. This indicates that the user is not interested in the image 1001. It can be understood that, in some other embodiments of this application, after the user performs slide unlocking, the image 1001 may continue to be displayed on the display screen, so that the user zooms in or out the image 1001.

Figure 11A:
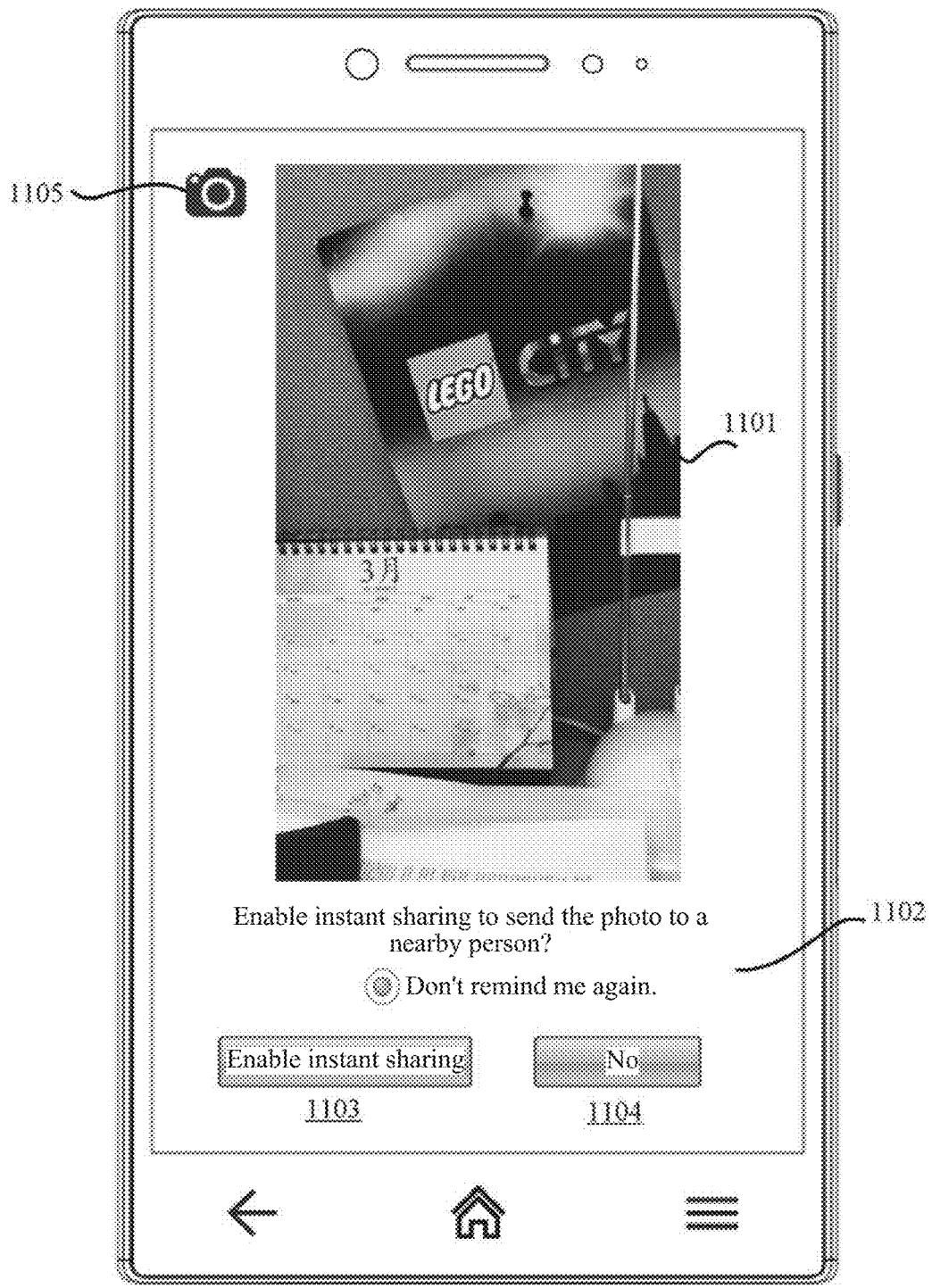
FIG. 11A and FIG. 11B are some graphical user interfaces displayed on a first electronic device according to some embodiments.
Figure 11B:
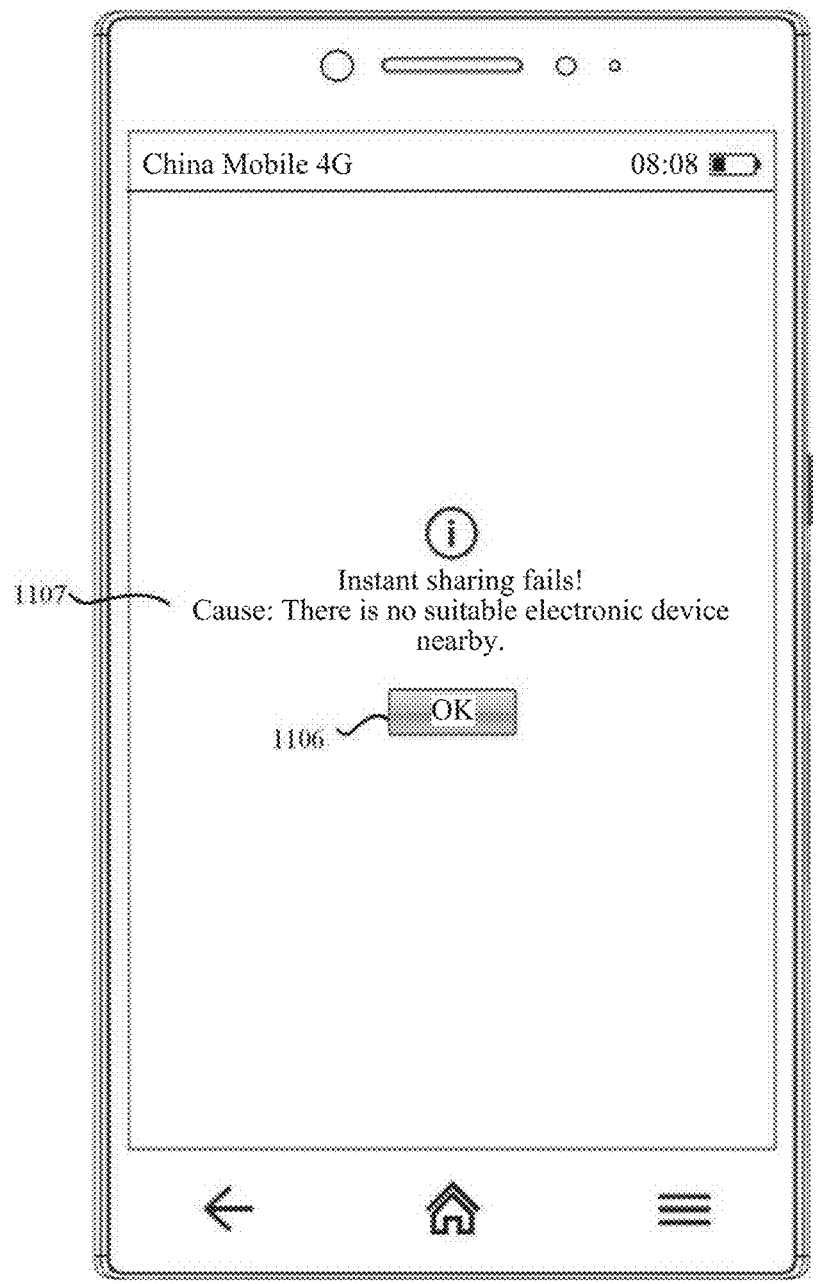

In some other embodiments of this application, an electronic device (such as the first electronic device 101 in the foregoing embodiments) may automatically enable a function of instant sharing after photo shooting, or enable a function of instant sharing based on user authorization after the user is prompted. As shown in FIG. 11A, after the user uses a camera to capture an image 1101, the image 1101 may be first displayed for preview by the user. In this case, the electronic device may ask, on the display screen, the user whether to enable the function of instant sharing. In FIG. 11A, a prompt box 1102 is used for asking the user whether to enable the function, and virtual buttons 1103 and 1104 are further displayed on the figure. The virtual button 1103 indicates that, after receiving a touch operation of the user on the virtual button 1103, in response to the touch operation, the electronic device may enable the function of instant sharing, subsequently enable Wi-Fi, Bluetooth, and the like, and establish wireless connections to another electronic device and a Wi-Fi wireless access point based on the related procedures in the foregoing embodiments. The virtual button 1104 indicates that, after receiving a touch operation of the user on the virtual button 1104, in response to the touch operation, the electronic device does not enable the function of instant sharing. In some other embodiments, an icon 1105 of photo shooting may be further displayed on the display screen of the electronic device, and the user may click the icon to display a GUI for photo shooting, to continue to shoot a photo. In some other embodiments of this application, after the user clicks the virtual button 1103 to enable the function of instant sharing, if the electronic device does not find another electronic device that performs Bluetooth pairing with the electronic device, a notification message indicating a sharing failure may be displayed on the display screen, as shown in FIG. 11B. A prompt box 1107 indicates that the electronic device currently does not find another appropriate electronic device, and sharing fails as a result. After the user clicks a virtual button 1106, in response to the touch operation, the electronic device may return to the GUI for photo shooting, so that the user continues to shoot a photo. In some other embodiments of this application, when the camera is started to perform shooting, the user may be asked whether to enable the function of instant sharing, or a control may be displayed on a main interface for photo shooting. The control may be used for enabling or disabling the function of instant sharing.

Figure 14:
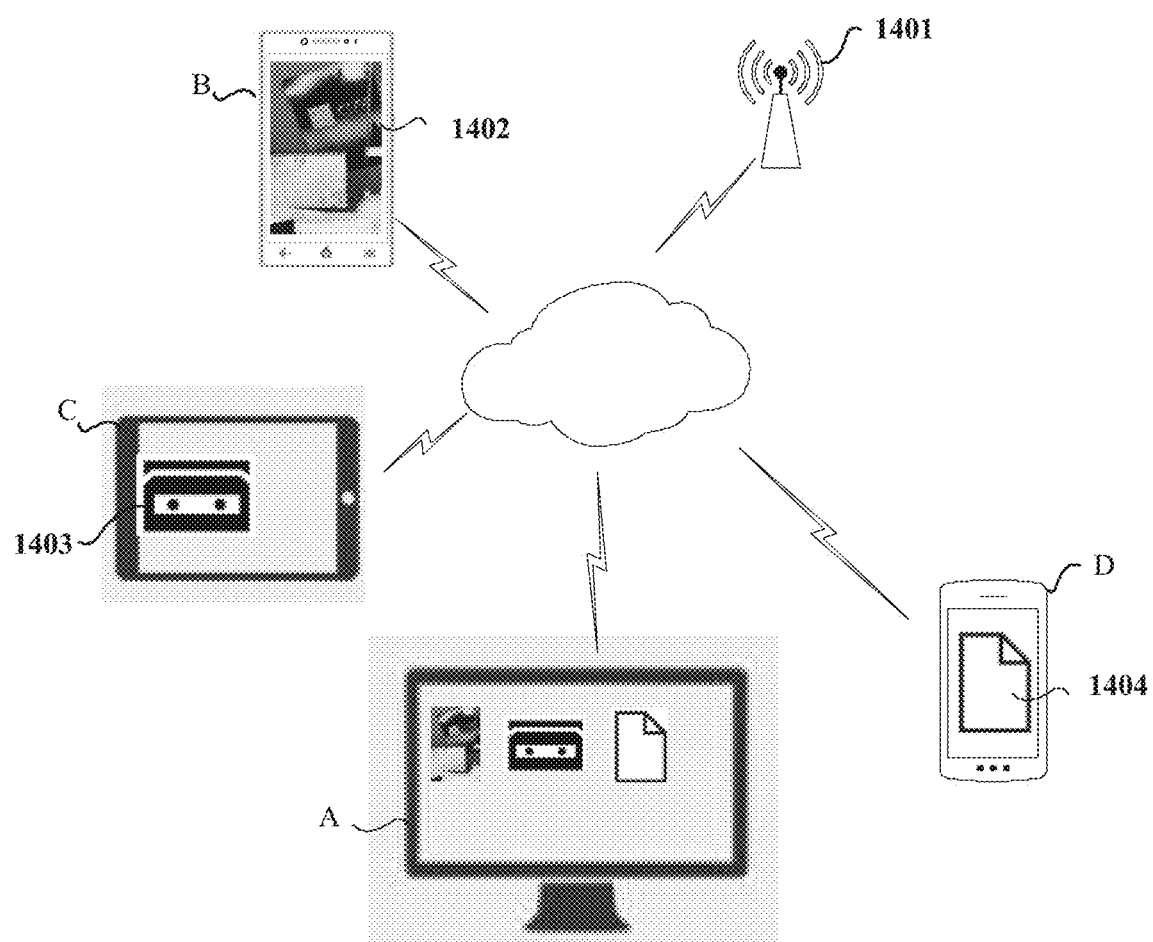
FIG. 14 is a schematic diagram of use scenarios for electronic devices according to some other embodiments.

As shown in FIG. 14, electronic devices A, B, C, and D establish wireless links to a same Wi-Fi wireless access point 1401. In addition, as Bluetooth slave devices, the electronic devices B, C, and D establish Bluetooth links to the electronic device A that serves as a Bluetooth master device. Therefore, after the electronic device B shoots a photo 1402, the photo may be instantly shared with the electronic device A automatically. Because the electronic device A is a master device, and the electronic devices C and D are both slave devices, the electronic device B does not send the photo 1402 to the electronic devices C and D over Wi-Fi wireless links. in this embodiment, the electronic device A may serve as the Bluetooth master device by default to receive an image (such as a photo or a video) or other data such as a sound recording and a document (such as a Word document or a TXT document) sent by a Bluetooth slave device (the electronic device B, C, or D) over the Wi-Fi wireless link, so that a user of the electronic device A performs specific editing processing based on the instantly shared photo, video, sound recording, document, or the like. For example, in FIG. 14, the electronic device B shoots a photo 1402, and sends the photo 1402 to the electronic device A by means of instant sharing. The electronic device C records a sound recording 1403, and sends the sound recording 1403 to the electronic device A by means of instant sharing. The electronic device D sends a document 1404 to the electronic device A by means of instant sharing. In this way, the user of the electronic device A may organize and edit the received data (for example, the photo 1402, the sound recording 1403, and the document 1404), and may continue to receive, during editing, data sent by the electronic devices B, C, and D. In some other embodiments of this application, after the user completes editing the data, the electronic device A may send the edited data to another electronic device that serves as a Bluetooth slave device. For example, the user may select, on the electronic device A, a slave device to which the data is sent.

Figure 13:
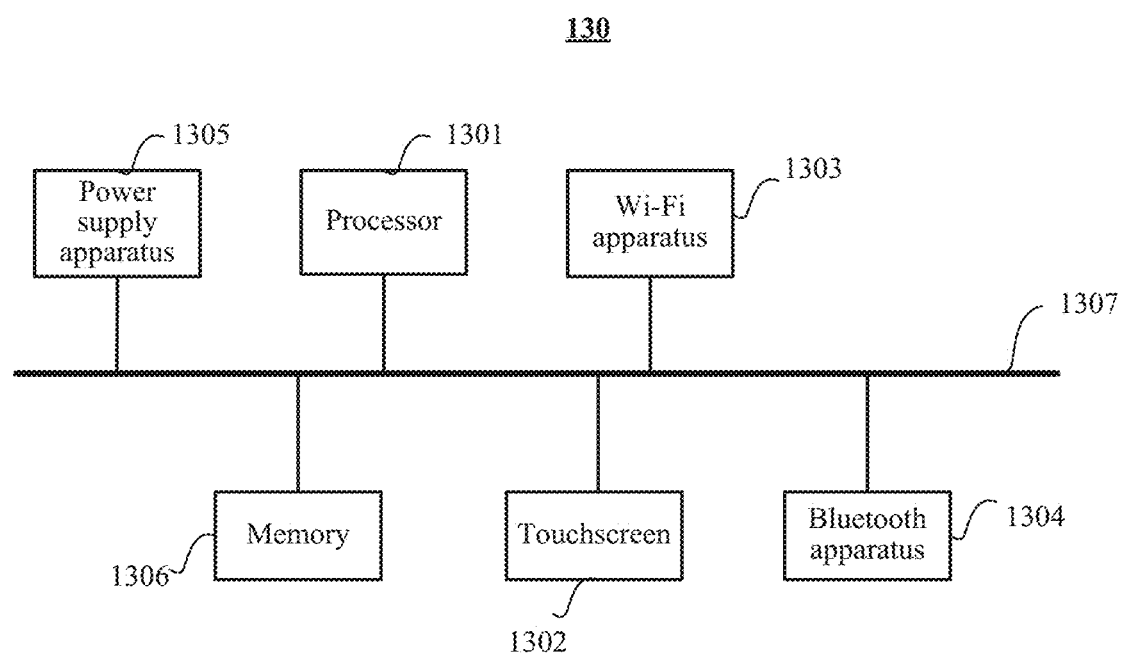
FIG. 13 is a schematic structural diagram of an electronic device according to some other embodiments.

An embodiment of this application provides an electronic device, As shown in FIG. 13, the electronic device 130 may include a processor 1301, a touchscreen 1302, a Wi-Fi apparatus 1303, a Bluetooth apparatus 1304, a power supply apparatus 1305, and a memory 1306. The foregoing parts of the electronic device 130 may be connected to each other by using one or more communications buses 1307. It can be understood that, although not shown in FIG. 13, the electronic device 130 may further include a radio frequency circuit, a positioning apparatus, a micro-projector, an NFC apparatus, and the like. Details are not described herein. The electronic device 130 establishes a Bluetooth link to another electronic device by using the Bluetooth apparatus 1304. The W-Fi apparatus 1303 establishes a Wi-Fi link to a Wi-Fi wireless access point. The electronic device 130 establishes a point-to-point connection to another electronic device by means of Wi-Fi Direct, to form a Wi-Fi Direct link, The processor 1301 obtains image information from the memory 1306. The image information includes an obtained image and/or device information of electronic device 130. The processor 1301 sends the image information to the another electronic device over the Wi-Fi Direct link.

After receiving the image information, the another electronic device determines whether a display screen of the another electronic device is on.

The another electronic device displays the image and the device information on the display screen if determining that the display screen is on; or the another electronic device does not display the image or the device information on the display screen if determining that the display screen is not on.

Some other embodiments of this application provide a computer device. The computer device may include a memory, a processor, and a computer program that is stored in the memory and that can be run in the processor. The processor performs the computer program to implement the steps in the foregoing embodiments.

In some other embodiments of this application, an electronic device is disclosed. The electronic device may include: a touchscreen, where the touchscreen includes a touch panel and a display; one or more processors; a memory; a plurality of application programs; and one or more programs. The one or more programs are stored in the memory and are performed by the one or more processors. The one or more programs include an instruction, and the instruction may be used for performing the steps in the foregoing embodiments.

It should be understood that, although terms such as "first" and "second" may be used in the foregoing embodiments to describe various electronic devices, these electronic devices should not be limited by these terms. These terms are used only for distinguishing an electronic device from another electronic device. For example, the first electronic device may be named a second electronic device and the second electronic device may be similarly named a first electronic device without departing from the scope of the embodiments of this application.

As used in the foregoing embodiments, based on the context, a term "if" may be construed as "when", or "after", or "in response to determining . . . ", or "in response to detecting . . . ". Similarly, based on the context, a phrase "if determining . . . " or "if detecting (the stated condition or event)" may be construed as "when determining . . . ", or "in response to determining . . . ", or "when detecting (the stated condition or event)", or "in response to detecting (the stated condition or event)".

The terms used in the embodiments are merely for the purpose of illustrating specific embodiments, and are not intended to limit this application. The terms "a", "said" and "the" of singular forms used in the embodiments and the appended claims are also intended to include plural forms, unless otherwise specified in the context clearly. It should also be understood that, the term "and/or" used herein indicates and includes any or all possible combinations of one or more associated listed items.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a digital versatile disc (DVD)), a semiconductor medium (for example, a solid state disk SSD), or the like.

For a purpose of explanation, the foregoing description is described with reference to a specific embodiment. However, the foregoing example discussion is not intended to be detailed, and is not intended to limit this application to a disclosed precise form. According to the foregoing teaching content, many modification forms and variation forms are possible. Embodiments are selected and described to fully illustrate the principles of the technical solutions and practical application of the principles, so that other persons skilled in the art can make full use of technical solutions and various embodiments that have various modifications applicable to conceived specific usage.

What is claimed is:

1. A system for sharing images comprising:
a first electronic device configured to:
   establish a first BLUETOOTH link with a second electronic device;
   establish a second BLUETOOTH link with a third electronic device;
   establish a first WI-FI link with the second electronic device;
   establish a second WI-FI link with the third electronic device;
   log into a user account by authenticating the first electronic device with a server;
   display a graphical user interface for editing an article on a display screen of the first electronic device;
   instantly receive a first image captured by the second electronic device over the first WI-FI link upon the second electronic device capturing the first image;
   automatically insert the first image into the article;
   instantly receive a second image captured by the third electronic device over the second WI-FI link upon the third electronic device capturing the second image; and
   automatically insert the second image into the article;
the second electronic device configured to:
   establish the first BLUETOOTH link with the first electronic device;
   establish the first WI-FI link with the first electronic device;
   log into the user account by authenticating the second electronic device with the server;
   capture the first image using a camera of the second electronic device; and
   send the first image to the first electronic device over the first WI-FI link; and
the third electronic device configured to:
   establish the second BLUETOOTH link with the first electronic device;
   establish the second WI-FI link with the first electronic device;
   log into the user account by authenticating the third electronic device with the server;

capture the second image using a camera of the third electronic device; and send the second image to the first electronic device over the second WI-FI link.

2. The system of claim 1, wherein the first electronic device is further configured to not display the first image when the display screen is off.

3. The system of claim 1, wherein the first electronic device is further configured to display the first image and the second image when the display screen is on.

4. The system of claim 1, wherein the first electronic device is further configured to:

receive a touch operation from a user, on the display screen, and within a preset time; and display the graphical user interface on the display screen in response to the touch operation, wherein the graphical user interface comprises the first image and a control that is used for editing the first image.

5. The system of claim 1, wherein the first electronic device is further configured to:

automatically add a first image description below the first image; and automatically add a second image description below the second image.

6. The system of claim 1, wherein the first electronic device is further configured to;

automatically typeset the article based on a shape of the first image and a shape of the second image; and display the article on the display screen.

7. The system of claim 1, wherein the first electronic device is further configured to automatically send the article to the second electronic device over the first WI-FI link and to the third electronic device over the second WI-FI link, and wherein the article comprises the first image and the second image.

8. The system of claim 1, wherein the first electronic device is further configured to:

automatically send the article to the second electronic device over the first WI-FI link when a display of the second electronic device is on; and not send the article to the third electronic device when a display of the third electronic device is off, wherein the article comprises the first image and the second image.

9. The system of claim 1, wherein the first electronic device is further configured to insert the first image and the second image into different locations of the article.

10. The system of claim 1, wherein the first electronic device is a portable computer, wherein the second electronic device is a mobile phone, and wherein the third electronic device is a tablet.

11. A system for sharing images comprising:

a first electronic device configured to:

establish a first BLUETOOTH link with a second electronic device;

establish a first WI-FI link with the second electronic device;

log into a user account by authenticating the first electronic device with a server;

display a graphical user interface for editing an article on a display screen of the first electronic device;

instantly receive a first image captured by the second electronic device over the first WI-FI link upon the second electronic device capturing the first image; and automatically insert the first image into the article; and the second electronic device configured to:

establish the first BLUETOOTH link with the first electronic device;

establish the first WI-FI link with the first electronic device;

log into the user account by authenticating the second electronic device with the server;

capture the first image using a camera of the second electronic device; and send the first image to the first electronic device over the first WI-FI link.

12. The system of claim 11, wherein the first electronic device is further configured to not display the first image when the display screen of the first electronic device is off.

13. The system of claim 11, wherein the first electronic device is further configured to automatically send the article to the second electronic device over the first WI-FI link, and wherein the article comprises the first image.

14. The system of claim 11, wherein the first electronic device is further configured to automatically send the article to the second electronic device over the first WI-FI link when a display screen of the second electronic device is on, and wherein the article comprises the first image.

15. The system of claim 11, wherein the first electronic device is further configured to:

receive a touch operation from a user on the display screen within a preset time; and display the graphical user interface on the display screen in response to the touch operation, wherein the graphical user interface comprises the first image and a control that is used to edit the first image.

16. The system of claim 11, wherein the first electronic device is further configured to automatically add a first image description below the first image.

17. The system of claim 11, wherein the first electronic device is further configured to:

automatically typeset the article based on a shape of the first image; and display the article on the display screen.

18. A method for sharing images, implemented by a first electronic device, comprising:

establishing a BLUETOOTH link with a second electronic device;

establishing a WI-FI link with the second electronic device;

logging into a user account by authenticating the first electronic device with a server;

displaying a graphical user interface for editing an article;

instantly receiving an image from the second electronic device over the WI-FI link upon the second electronic device capturing the image; and automatically inserting the image into the article.

19. The method of claim 18, further comprising not receiving, the image from the second electronic device when a display of the first electronic device is off.

20. The method of claim 18, further comprising:

automatically adding an image description below the image;

automatically typesetting and displaying the article based on a shape of the image; and displaying the article on a display screen.

* * * * *